US010093331B2

(12) United States Patent
Danielson et al.

(10) Patent No.: US 10,093,331 B2
(45) Date of Patent: *Oct. 9, 2018

(54) TRAIN AUTOMATIC STOPPING CONTROL WITH QUANTIZED THROTTLE AND BRAKING

(71) Applicant: Mitsubishi Electric Research Laboratories, Inc., Cambridge, MA (US)

(72) Inventors: Claus Danielson, Somerville, MA (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/230,547

(22) Filed: Aug. 8, 2016

(65) Prior Publication Data

US 2018/0037243 A1 Feb. 8, 2018

(51) Int. Cl.
*B60W 50/06* (2006.01)
*B61L 27/04* (2006.01)
(Continued)

(52) U.S. Cl.
CPC ........... *B61L 27/04* (2013.01); *B60W 30/146* (2013.01); *B60W 50/06* (2013.01); *B61L 3/006* (2013.01); *B61L 15/0027* (2013.01); *B61L 25/021* (2013.01); *B61L 25/025* (2013.01); *B61L 27/0027* (2013.01); *G05D 1/0077* (2013.01);
(Continued)

(58) Field of Classification Search
CPC .............. B60W 30/146; B60W 50/06; B60W 2050/0013; B60W 2510/0609; B60W 2510/18; B61L 27/04; B61L 25/025; B61L 2201/00; B61L 1/188; B61L 3/00; B61L 3/008; B61L 3/08; B61L 3/221; B61L 3/24; B61L 25/02; B61L 27/00; B61L 27/0038; G05D 1/0077; G05D 3/00; B61H 13/34;
(Continued)

(56) References Cited

U.S. PATENT DOCUMENTS 4,302,811 A 11/1981 McElhenny
4,384,695 A * 5/1983 Nohmi ...................... B61L 3/12
246/182 B
(Continued)

*Primary Examiner* — McDieunel Marc
(74) *Attorney, Agent, or Firm* — Gene Vinokur; James Mcaleenan; Hironori Tsukamoto

(57) ABSTRACT

Methods and systems for controlling a train movement to a stop at a stopping position between a first position and a second position. Determining constraints of a velocity of the train with respect to a train position forming a feasible region (FR) for a state of the train during the movement, such that a lower curve bounding the FR has a zero velocity only at the first position, and an upper curve bounding the FR has a zero velocity only at the second position. Determining a control invariant subset (CIS) of the FR, wherein for each state within the CIS there is at least one control action having a value selected from a finite set of values that maintains the state of the train within the CIS. Controlling train movement subject to constraints by selecting a control action maintaining the state of the train within the CIS of the FR.

20 Claims, 24 Drawing Sheets

(51) Int. Cl.
*B60W 30/14* (2006.01)
*B61L 25/02* (2006.01)
*G05D 1/00* (2006.01)
*B61L 3/00* (2006.01)
*B61L 15/00* (2006.01)
*B61L 27/00* (2006.01)
*B60W 50/00* (2006.01)

(52) U.S. Cl.
CPC ............... *B60W 2050/0013* (2013.01); *B60W 2510/0609* (2013.01); *B60W 2510/18* (2013.01); *B61L 2201/00* (2013.01)

(58) Field of Classification Search
CPC ....... B61H 13/00; B60L 3/0015; H04L 27/14; H04L 27/148
USPC .......................................................... 701/20
See application file for complete search history.

(56) References Cited

U.S. PATENT DOCUMENTS

| | | | |
|---|---|---|---|
| 4,562,543 A | | 12/1985 | Zuber et al. |
| 4,988,061 A | * | 1/1991 | Miller ...................... B60L 3/00 |
| | | | 246/167 R |
| 5,018,689 A | | 5/1991 | Yasunobu et al. |
| 5,474,267 A | | 12/1995 | Kubota et al. |
| 5,487,516 A | * | 1/1996 | Murata ............... B61L 27/0022 |
| | | | 246/182 C |
| 8,224,511 B2 | | 7/2012 | Demaya et al. |
| 9,387,866 B1 | * | 7/2016 | Di Cairano ............. B61L 27/04 |
| 2011/0196647 A1 | * | 8/2011 | Perala .................. G01C 21/206 |
| | | | 702/150 |
| 2013/0151107 A1 | | 6/2013 | Nikovski et al. |

* cited by examiner

TRAIN AUTOMATIC STOPPING CONTROL WITH QUANTIZED THROTTLE AND BRAKING

FIELD

The present disclosure relates generally to automated process control, and more particularly to systems and methods for stopping a train at a position with an automatic control that actuates a traction-braking system action from a finite set of values subject to stopping constraints that maintains a state of the train within a feasible region.

BACKGROUND

The Train Automatic Stopping Control (TASC) system, which is often part of an Automatic Train Operation (ATO) system, manages the train braking system to stop the train at the predetermined location. The TASC system receives measurements from sensors, on the train and/or on remote stations via communication networks, estimates the state of the train including a position and a velocity of the train, and selects the actions for the braking system. These steps are repeated multiple times until the train stops.

The TASC system allows the trains equipped with TASC to stop automatically at stations without the need to operate the brakes manually. The TASC was originally developed in the 1950s and the 1960s as a way of ensuring that trains stop properly at stations, especially if the driver has made a minor driving lapse and stopped with a slight overrun/underrun. When station platforms are provided with screen doors, the doors of the train must be aligned with the platform doors as otherwise the operation of automatic trains, particularly driverless underground trains, is disrupted.

Most of the conventional methods select the control action in the TASC system according to an infinite possible velocity profiles determined based on a distance between the current position of the train and the stop position see, for example, U.S. 2013/0151107.

However, the generation of those velocity profiles are difficult and/or time and resource consuming. In addition, the selection of the optimal velocity profile is prone to errors due to uncertainty of some of the parameters of the movement of the train, such as the mass of the train, track friction along with other errors. In practice, many reference profiles are generated before the train operation and are based on different assumptions of train and environmental parameters. For example, a particular reference profile can be used in each operation of stopping which is selected based on evaluating the current conditions. Nonetheless, there is not guarantee that one velocity profile satisfies exactly the current conditions available, and/or that the current conditions are exactly known, and/or that the current conditions do not change during the execution of the stopping.

For instance, a velocity profile can be selected based on high friction of the rails as in the case of dry rails to minimize the stopping time by exploiting the high rail friction. However, if the rail conditions change during the stopping, for instance due to encountering a section of track where the rails are wet, the wet rails reduce rail friction. Thus, because of the change in rail conditions during the stopping can result in an impossible situation to achieve the desired braking effort. Hence the train velocity profile would deviate from the selected velocity profile, and the train stop pasts the desired stopping point, missing alignment with the station.

Furthermore, separation of trajectory generation and control to follow trajectory can fail to follow the selected run curve exactly due to, e.g., the imprecisions of the braking system, change of the train parameters, external disturbances, among other things, so the train fails to stop at the desired location.

Furthermore, generally one is not likely going to first generate a trajectory and then control the train to follow the trajectory based on feedback from sensors that adjusts to current conditions, due to a two steps design procedure. In addition, the concurrent generation of the trajectory and feedback control action subject to uncertainty in the parameters is notoriously difficult to achieve because the uncertainty reduces the accuracy of prediction of the future behavior of the train, which is required for optimization.

Accordingly, there is a need to provide systems and methods for stopping a train at a position with an automatic control.

SUMMARY

Embodiments of the present disclosure are based on the realization that stopping constraints can be used to define a state of a movement of the train, such that a constrained movement of the train stops the train at a predetermined stopping range. The stopping constraints form a feasible area or region for a state of the train during the movement, such that satisfaction of the stopping constraint guaranties the stopping of the train at the stopping position. Specifically, the realization further included, the feasible region having at least one state with zero velocity at the stopping range, and controls the movement of the train with a finite set of values, such that the state of the train is always within that feasible region.

Thus, the realization that train movement can be controlled with a finite set of values resulted in discovering there are many advantages over conventional braking action systems and methods. For example, some advantages of the systems and methods of the present disclosure, in part, allowing to control the train movement with a finite set of values, includes eliminating the need to generate velocity profiles, and/or the effects of braking system chatter, among other things. Another advantage of the systems and methods of the present disclosure, specific to the ability to control the train movement with a finite set of values, includes the ability to always provide for an exact stopping precision of train or some other object, among other things.

Accordingly, some embodiments of the present disclosure include a controller that selects a braking system action from a finite set of values that maintains a state of the train within the feasible region by repeatedly solving a mixed integer optimization problem. Other embodiments of the present disclosure transform the tracking problem as a convex optimization problem, where the braking system action can be selected from a continuous set and a quantization rule that is used to obtain a braking force from a finite set of values.

According to some embodiments of the present disclosure, the systems and methods are based on yet another realization that it is possible to select a subset of the feasible region, such that from any state of the train, any possible variations in the parameters of the movement of the train, and any quantization error there is a control from the finite set of values maintaining the state of the train within the subset. For example, for each state within the control invariant subset there is at least one control action in the finite set of values maintaining the state of the train within the control invariant subset. Wherein a control invariant subset generating unit can be used for selecting a control invariant subset from the feasible region, such that the feasible region is defined by the stopping constraints.

Some embodiments of the present disclosure are based on yet another realization that to select a subset of the feasible region, such that from any state of the train and any possible variations in the parameters of the movement of the train, there is a braking force in the finite set of values that maintains the state of the train within the subset. Accordingly, if a cost function representing the movement of the train is optimized subject to constraints defined by that special subset of the feasible region, as contrasted with the optimization within the feasible region itself, there is a guarantee that the train stops within the predetermined stopping range.

According to some embodiments of the present disclosure, the systems and methods are based on another realization that if the finite (input) set of values are vectors then the quantization errors will have a magnitude and direction. It was further realized that quantization errors in different directions can have different effects on the ability of the train to precisely stop. Thus, an automatic train-stopping controller can place the train on a trajectory that can terminate within the desired stopping range, which results in placing the train along a safe trajectory and thus has a less effect on stopping precision.

According to an embodiment of the disclosure, a method for controlling a movement of a train to a stop at a stopping position between a first position and a second position. The method including determining constraints of a velocity of the train with respect to a position of the train forming a feasible region for a state of the train during the movement, such that a lower curve bounding the feasible region has a zero velocity only at the first position, and an upper curve bounding the feasible region has a zero velocity only at the second position. Determining a control invariant subset of the feasible region, wherein for each state within the control invariant subset there is at least one control action having a value selected from a finite set of values that maintains the state of the train within the control invariant subset. Finally, controlling the movement of the train subject to the constraints by selecting a control action maintaining the state of the train within the control invariant subset of the feasible region, wherein the steps of the method are performed by a processor.

According to another embodiment of the disclosure, a method for controlling a movement of a train to a stop, at a stopping position between a first position and a second position over a finite horizon of time. The method includes determining constraints of a velocity of the train with respect to a position of the train forming a feasible region for a state of the train during the movement, such that a lower curve bounding the feasible region has a zero velocity only at the first position, and an upper curve bounding the feasible region has a zero velocity only at the second position. Determining a control invariant subset of the feasible region, wherein for each state within the control invariant subset there is at least one control action having a value selected from a finite set of values that maintains the state of the train within the control invariant subset. Finally, controlling the movement of the train subject to the constraints by selecting a control action maintaining the state of the train within the control invariant subset of the feasible region over the finite horizon of time, wherein the steps of the method are performed by a processor.

According to embodiment of the disclosure, a system for controlling a movement of a train to a stop at a stopping position between a first position and a second position. The system includes a set of sensors that monitor and collect data relating to operation of the train. The system includes a memory having stored therein train data. The system includes at least one processor, coupled to the memory, and instructions stored therein, for execution by the at least one processor to: determine constraints of a velocity of the train with respect to a position of the train forming a feasible region for a state of the train during the movement, such that a lower curve bounding the feasible region has a zero velocity only at the first position, and an upper curve bounding the feasible region has a zero velocity only at the second position. Determine a control invariant subset of the feasible region, wherein for each state within the control invariant subset there is at least one control action having a value selected from a finite set of values that maintains the state of the train within the control invariant subset. Control the movement of the train subject to the constraints by selecting a control action maintaining the state of the train within the control invariant subset of the feasible region.

Further features and advantages will become more readily apparent from the following detailed description when taken in conjunction with the accompanying drawings.

BRIEF DESCRIPTION OF THE DRAWINGS

The presently disclosed embodiments can be further explained with reference to the attached drawings. The drawings shown are not necessarily to scale, with emphasis instead generally being placed upon illustrating the principles of the presently disclosed embodiments.

Figure 1A:
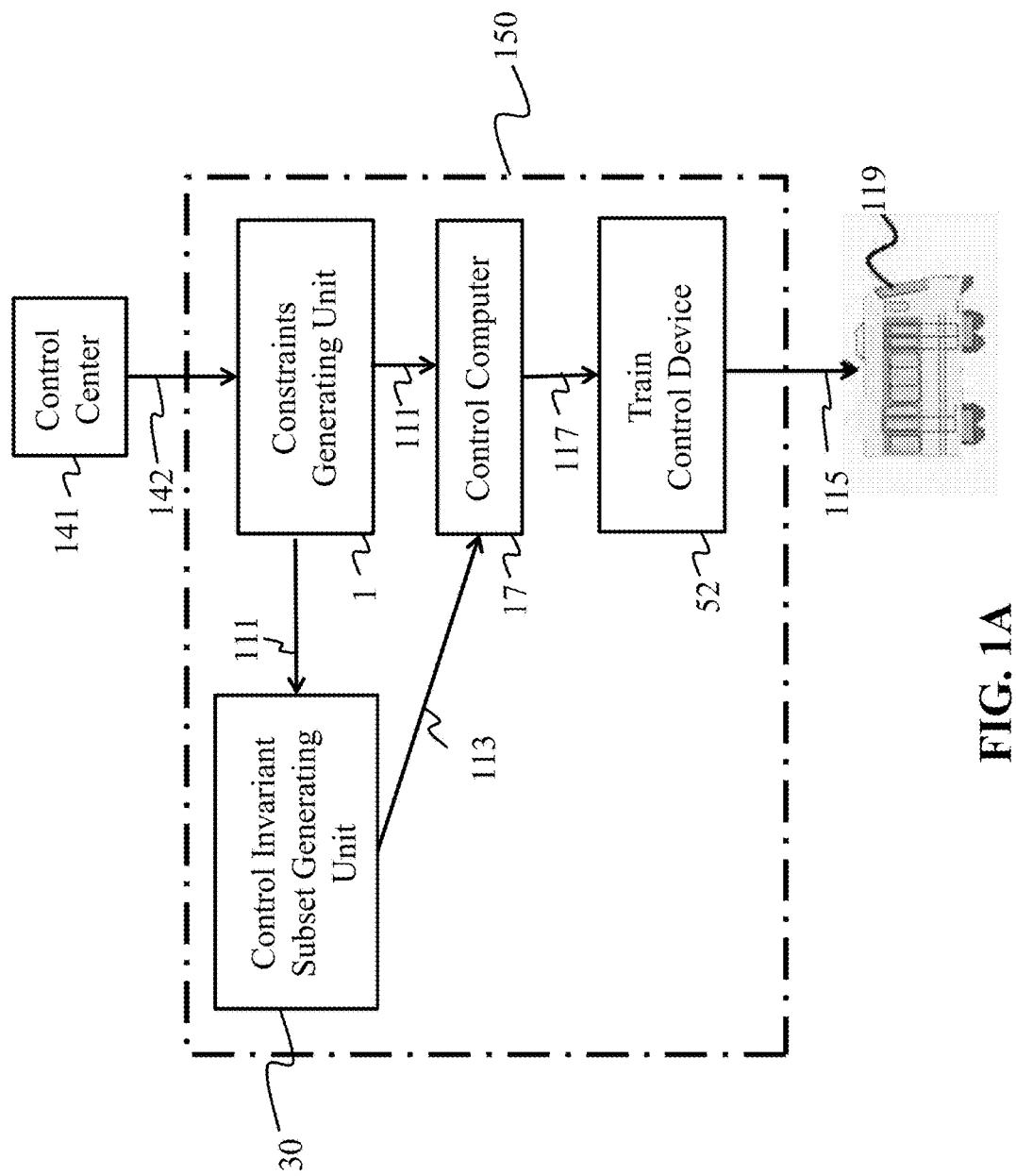
FIGS. 1A and 1B are schematics of a system for controlling of a movement of a train to a stop, at a stopping position, according to one embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1B:
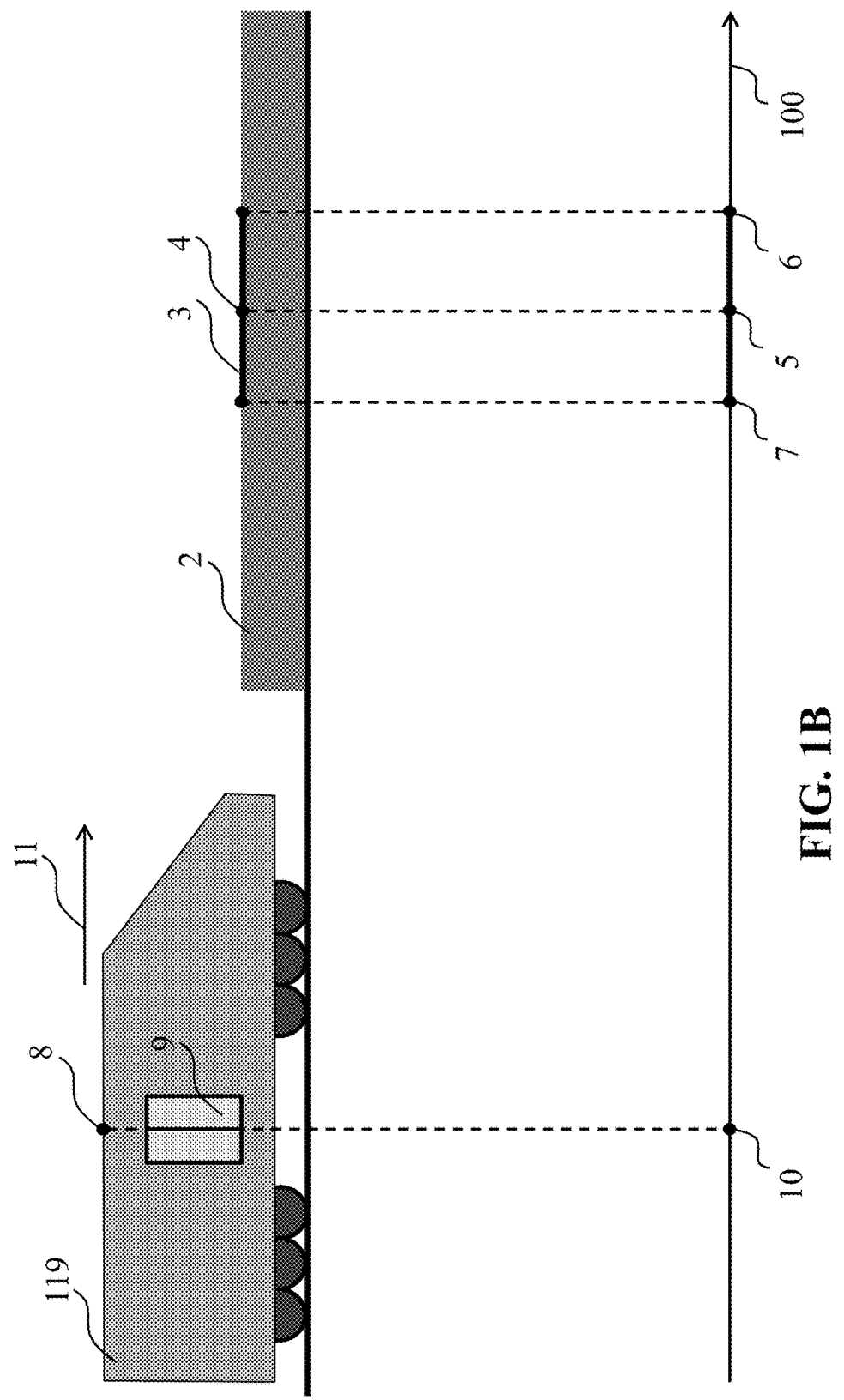

FIGS. 1A and 1B are schematics of a system for controlling of a movement of a train to a stop, at a stopping position, according to one embodiment of the present disclosure. FIGS. 1A and 1B show a system for controlling a movement of a train 119 to a stop at a stopping position. The term "train" can be used generally and can be understood to include any guided means of transportation, such as, but not limited to, electrical trains, guided transport systems at airports, guided hybrid cars or the like. The train can be provided with wheels, often referred to as rolling stocks that are in contact with and roll on the rail tracks.

A control system 150 controls the movement of the train 119 traveling towards a station 2 (FIG. 1B) such that the train stops at a pre-determined range of positions 3 between a first position 7 and a second position 6 without stopping anywhere else. Some embodiments select a reference system 100 having the origin 5 at a point 4 in the stopping range 3. Thus, the first positions $\varepsilon_{min}<0$, and the second position $\varepsilon_{max}>0$, $\varepsilon_{max}>\varepsilon_{min}$ are the nearest 7 and furthest 6 positions with respect to the current position of the train where the train is allowed to stop. As used herein, when the train moved to the stop at the stopping position, the train has a zero velocity at the stopping position.

The current position d 10 of the train can be determined as the distance of a specific point 8 of the train, such as the center of the first door 9, from the origin 5 of the reference system, where d is negative when the train is at a position before the origin with respect to the normal direction of movement of the train. The velocity 11 of the train 119 is v, where v is positive when the train is moving in its normal direction of the movement.

A control system 150 of the train 119 can include one or combination of a constraints generating unit 1, a control invariant subset generating unit 30, a train control device 52, and a control computer 17. In some embodiments, the constraints generating unit 1 determines stopping constraints 111 of a velocity of the train with respect to a position of the train forming a feasible area for a state of the train during the movement leading the train to the stop, and the control computer 17 controls the movement of the train subject to the constraints. The control can be achieved, e.g., by generating a control input 117 to the train control device 52 controlling 115 the break system of the train 119. The control system 150 can be in communication with a control center 141, wherein input 142 from the control center is provided to the control system. The control center can provide additional station dependent information to the control system such as the width of the desired stopping range, the minimum and maximum approach velocity, and the local weather conditions that can affect rail friction.

In various embodiments, the stopping constraints are determined without having a predetermined run-curve, or conventional velocity profile, leading the train from the current position to the stopping position. For example, if a distance along the route is denoted by z, then a desired velocity v(z) at position z describes the run curve, or conventional velocity profile. The conventional velocity profile has to obey legal and mechanical constraints of the route, e.g. speed limits, safety margins, and must be physically realizable by mechanisms of the train. In effect, these special stopping constraints of the present disclosure, control of the movement of the train, without generating conventional velocity profiles/patterns that are prone to errors.

Accordingly, some embodiments of the present disclosure transform the tracking problem into an optimization problem subject to these constraints. Such transformation is advantageous, because the constrained control can guarantee that the constraints are always satisfied, among other things.

For example, some embodiments determine, for each time step of control, a control action moving the train from a current position to a next position within the feasible region. In those embodiments, the controlling includes determining a sequence of control inputs forming an ad-hoc run-curve leading the train from the current position to the stopping position. Such ad-hoc run-curve determination is advantageous because it eliminates efforts needed to generate and test predetermined run-curves. Also, reformulating the stopping into a constrained problem allows handling the stopping constraints with other constraints on the movement of the trains, such as constraints on traction and braking force range, actuator rate, and/or maximum and minimum speed of the train.

However, due to the nature of optimization-based receding horizon control, the existence of a solution for a certain horizon does not by itself guarantees the existence of the solution for a subsequent horizon. This is exacerbated by quantization errors which cause the implemented braking action to deviate from the requested braking action. Thus, some embodiments also include the control invariant subset generating unit 30 for selecting a control invariant subset 113 from the feasible region defined by the stopping constraints. These embodiments are based on yet another realization that it is possible to select a subset of the feasible region, such that from any state of the train, any possible variations in the parameters of the movement of the train, and any quantization error there is a control from the finite set of values maintaining the state of the train within the subset, as noted above.

For example, some embodiments design a controller that select the braking system action that to maintain the state of the train within the feasible region by repeatedly solving an optimization problem. Accordingly, if a cost function representing the movement of the train is optimized subject to constraints defined by that special control invariant subset of the feasible region, as contrasted with the optimization within the feasible region itself, there is a guarantee that the train stops within the predetermined stopping range. For example, in various embodiments, the cost function represents a combination of the energy consumption of the train during the trip, a time of the trip, both the energy consumption and the time of the trip, the energy consumption for a predetermined time of the trip, or the smoothness of the stopping trajectory. The optimization problem can directly select braking actions from the finite set of values in which case the optimization problem is a mixed-integer problem. In other embodiments, the control is selected by solving a convex optimization problem and applying a quantization rule which chooses a braking action from the finite set of values.

Soft Landing Constraints

For example, to stop the train at the stopping position within the stopping range, it is sufficient for the train distance from target d, and velocity v, to satisfy at any time instant soft landing constraints $$v(t) \leq \Gamma_{max}(\varepsilon_{max} - d(t))$$

$$v(t) \geq \Gamma_{min}(\varepsilon_{min} - d(t)) \quad (1)$$

wherein $\Gamma_{max}(s)$ $\Gamma_{min}(s)$ are the upper border function and the lower border function that are defined in the range $s \in (-\infty, C]$ where $c \geq \varepsilon_{max}$, are continuous, greater than 0 when their arguments are positive, smaller than 0 when their arguments are negative, and 0 when their arguments are 0. Furthermore for any $s \in (-\infty, c]$, $\Gamma_{max}(s) \geq \Gamma_{min}(s)$ and $\gamma_{max}(c) = \Gamma_{min}(c)$.

Figure 2A:
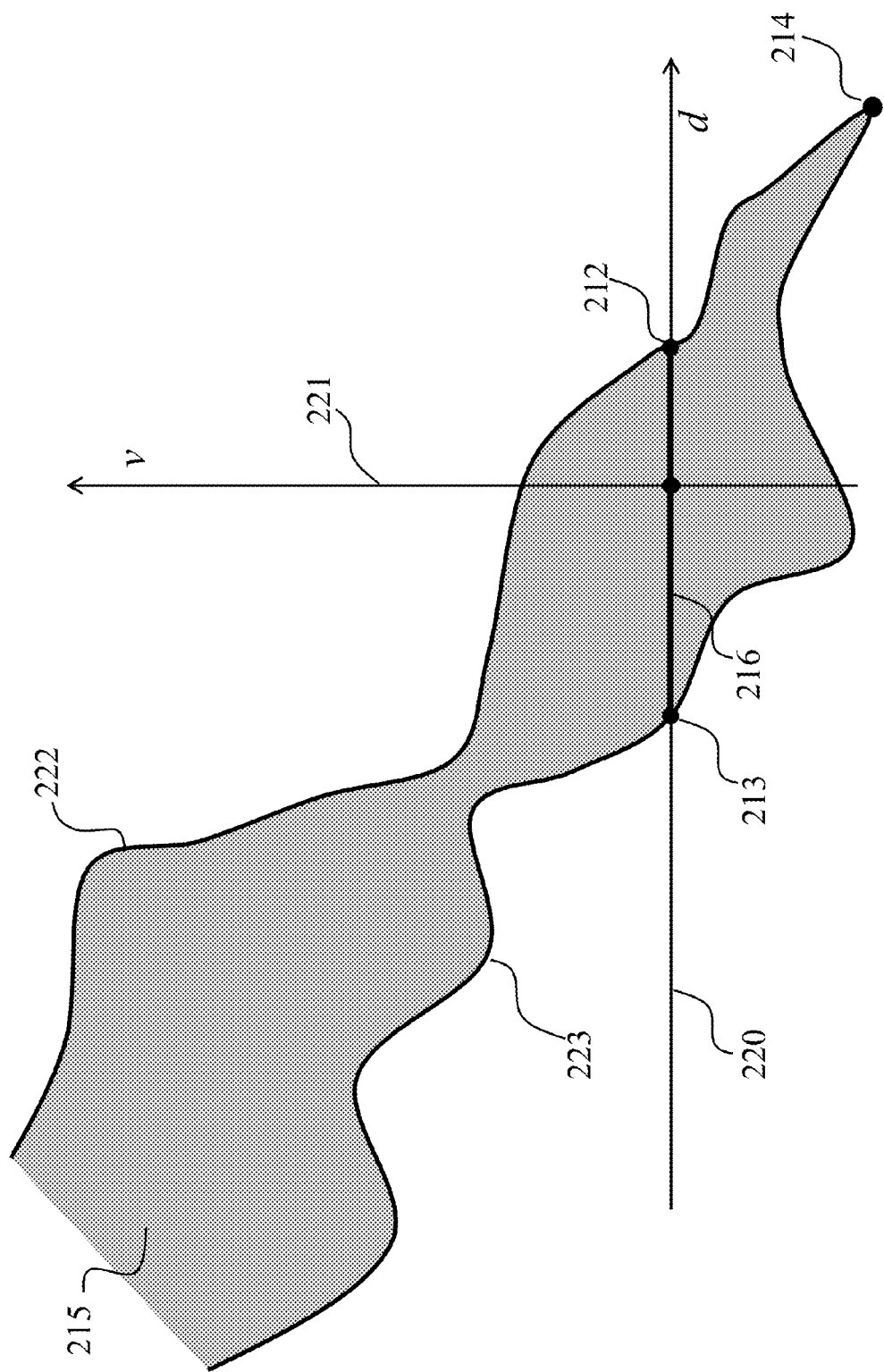
FIG. 2A is a schematic illustrating a feasible area for a state of the train during movement, according to some embodiments of the present disclosure.

FIG. 2A is a schematic illustrating a feasible area 215 for a state of the train during movement, according to some embodiments of the present disclosure. In this example, a Cartesian axis with train position d is on the x axis 220, and train velocity v is on they y axis 221. An upper curve 222 bounding the feasible area 215 has a zero velocity only at the second position 212, i.e., the upper curve intersects the x axis at a distance 212 equal to $\varepsilon_{max}$. Similarly, a lower curve 223 bounding the feasible region has a zero velocity only at the first position 213, i.e., the lower curve intersects the x axis at a distance 213 equal to $\varepsilon_{min}$. The upper and the lower curves can intersect at the same point 214 at distance $c > \varepsilon_{max}$.

Intuitively, if the feasible area 215 includes the current position of the train and the state of the train is controlled to be maintained within the feasible area 215, at some instant of time the state of the train is guaranteed to be on a segment 216 between the points 213 and 212, which corresponds to a zero velocity of the train at the predetermined stopping range.

For example, when $d < \varepsilon_{min}$ the constraints (1) forces the train velocity to be positive, so that the train moves towards the target, when the position is beyond the stopping range $d > \varepsilon_{max}$ the constraints (1) forces the train velocity to be negative and hence the train backs-up towards the target, and that hence any trajectory of the train must include a point of zero velocity in the range of positions between $\varepsilon_{max}$ and $\varepsilon_{min}$, which means that the train stops at a desired stopped range.

Figure 2B:
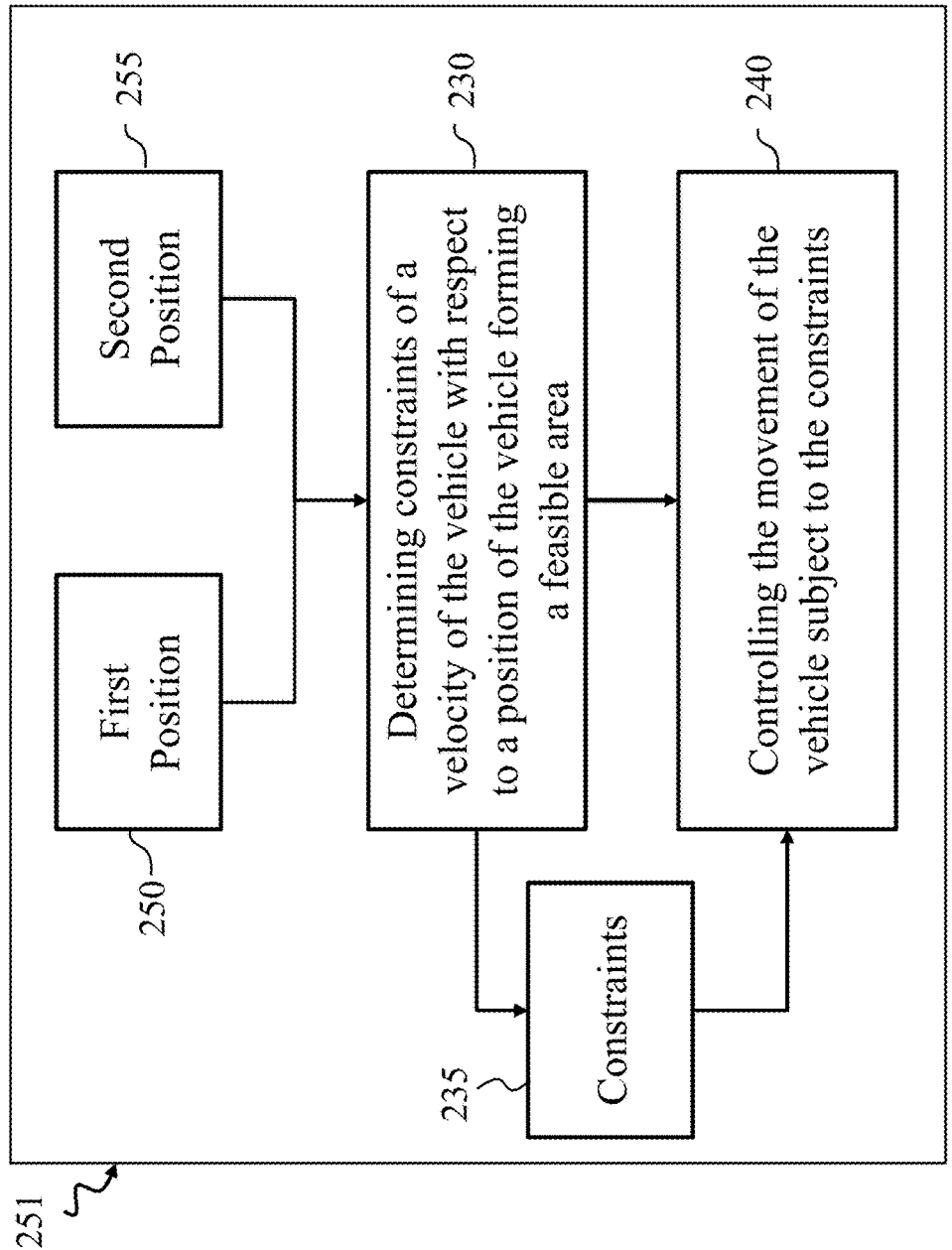
FIG. 2B is a block diagram of a method for controlling of a movement of a train to a stop, at a stopping position, according to one embodiment of the present disclosure.

FIG. 2B shows a block diagram of a method for controlling of a movement of a train to a stop at a stopping position between a first position 250 and a second position 255 according to one embodiment of the present disclosure. The method determines 230 constraints 235 of a velocity of the train with respect to a position of the train. The constraints 235 are stopping constraints that form a feasible area for a state of the train during the movement, such that satisfaction of the stopping constraint guaranties the stopping of the train at the stopping position. The constraints 235 are determined such that an upper curve bounding the feasible area has a zero velocity only at the second position, and a lower curve bounding the feasible region has a zero velocity only at the first position. Next, the method controls 240 the movement of the train subject to the constraints. Steps of the method are performed by a processor 251. The constraints can be computed by the processor on the train or pre-computed by a processor elsewhere and stored in memory.

In such a manner, the embodiments provide for stopping a train at a position with an automatic control 240, but without the predetermined velocity profiles. This is because the constraints on the state of the movement of the train that guarantees the stopping of the train at the predetermined stopping range can be generated without the velocity profiles. For example, instead of generating multiple velocity profiles, only two constraints defining a lower and an upper curve of the feasible region can be determined. Also realized in this present disclosure is that the selection of the constraints affects the minimum and maximum arrival time of the train at the position, such that the time of arrival can be used as guidance for generating those constraints.

For example, some embodiments determine a lower curve and an upper curve bounding a velocity of the train with respect to a position of the train, such that the upper curve has a zero velocity only at the farthest border of a stopping range, and the lower curve has a zero velocity only at the nearest border of the stopping range, and determine the feasible region for a state of the train using the lower and the upper curves and mechanical and/or legal constraints on the movement of the train. For example, in one embodiment the upper curve can be a first line with a first slope, and the lower curve can be a second line with a second slope. Usually, the first slope is greater than the second slope to enforce a sufficient size for the feasible region. This embodiment can reduce the selection of the constraints only to the values for the slopes of the first and the second lines.

Also realized is that the selection of the constraints affects the minimum and maximum arrival time of the train at the stopping range, and the desired arrival time can be used in the selection of the two parameters. For example, one embodiment selects the value of the first slope based on a minimal stopping time, and selects the value of the second slope based on a maximal stopping time.

Figure 2C:
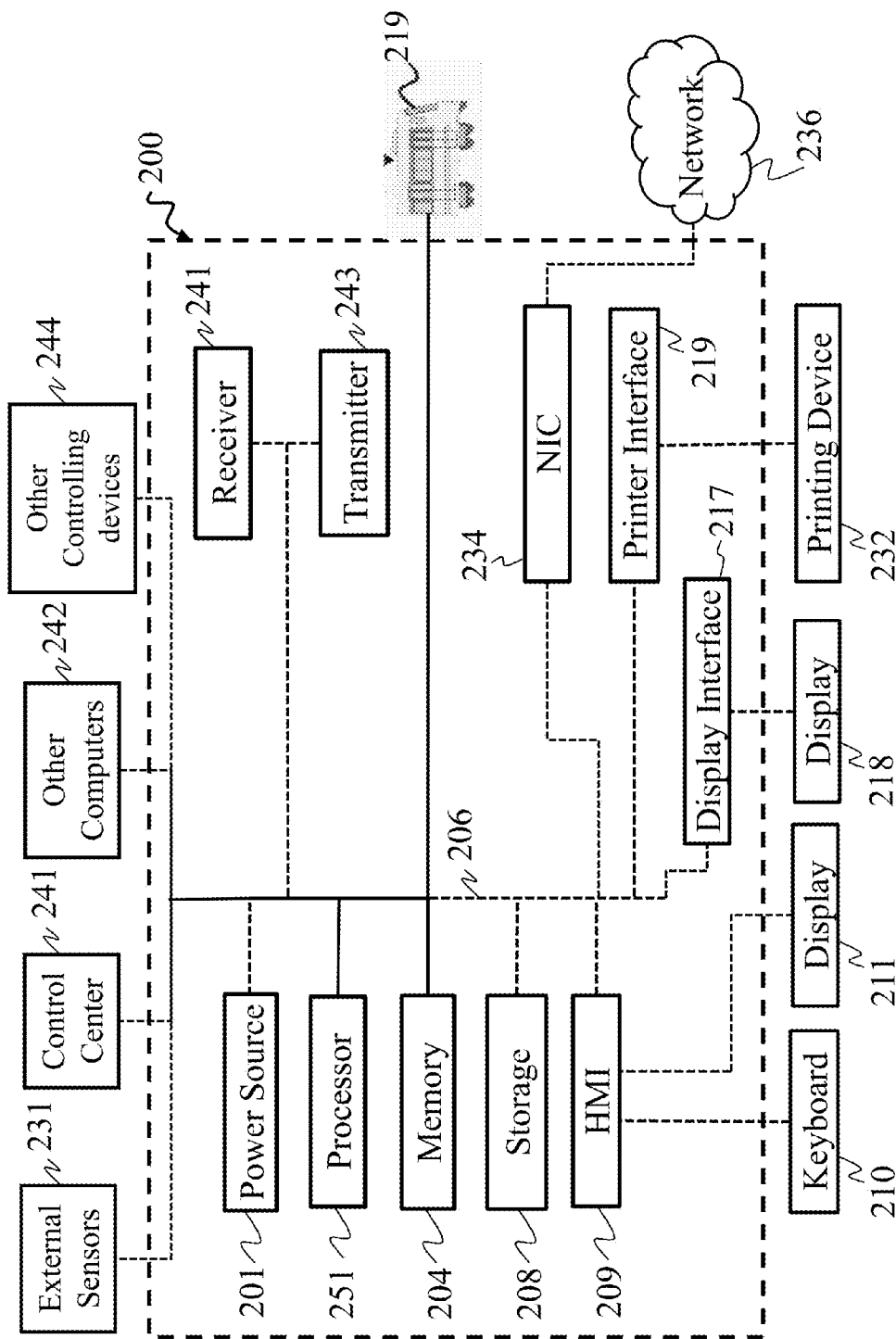
FIG. 2C is a block diagram of a computer system that includes a processor for controlling of the movement of the train to a stop, at a stopping position, in accordance with some embodiments of the present disclosure.

FIG. 2C is a block diagram of a computer system 200 that includes a processor 251 for controlling of the movement of the train to a stop, at a stopping position, in accordance with some embodiments of the present disclosure. The computer system 200 includes a power source 201, depending upon the application the power source may be optionally located outside of the computer system. The processor 251 can be configured to execute stored instructions, as well as be in communication with a memory 204 that stores instructions that are executable by the processor. The processor 251 can be a single core processor, a multi-core processor, a computing cluster, or any number of other configurations. The processor 251 is connected through a bus 206 to one or more input and output devices. The memory 204 can include random access memory (RAM), read only memory (ROM), flash memory, or any other suitable memory systems.

Still referring to FIG. 2C, the computer system 200 can also include a storage device 208 adapted to store supplementary data and/or software modules used by the processor. For example, the storage device 208 can store historical data relating to similar train data relating to movement and stopping the train, among other things. The storage device 208 can include a hard drive, an optical drive, a thumb-drive, an array of drives, or any combinations thereof.

A human machine interface 209 within the computer system 200 can connect the system to a keyboard 210 and display device 211. The computer system 200 can be linked through the bus 206 to a display interface 217 adapted to connect the system 200 to a display device 218, wherein the display device 218 can include a computer monitor, camera, television, projector, or mobile device, among others.

Still referring to FIG. 2C, a printer interface 219 can also be connected to the computer system 200 through the bus 206 and adapted to connect the computer system 200 to a printing device 232, wherein the printing device 232 can include a liquid inkjet printer, solid ink printer, large-scale commercial printer, thermal printer, UV printer, or dye-sublimation printer, among others. A network interface controller 234 is adapted to connect the computer system 200 through the bus 206 to a network 236. The train data or related train data, among other things, can be rendered on a display device, imaging device, and/or printing device.

Still referring to FIG. 2C, the train data or related train data, among other things, can be transmitted over a communication channel of the network 236, and/or stored within the computer's storage system 208 for storage and/or further processing. Further, the train data or related train data may be received wirelessly or wire from a receiver 241 or transmitted via a transmitter 243 wirelessly or wire, the receiver and transmitter are both connected to the computer system 200 through the bus 206.

The computer system 200 may be connected to external sensors 231, the control center 241, other computers 242 and other controlling devices 244. For example, the train automatic stopping control can be connected to low level controllers such as traction controllers, train brake controllers, etc. For example, the train automatic stopping controller can connect to other computers such as the passenger information system to provide estimated arrival times, and the door controllers in order to ensure that the doors do not open until the train is fully stopped. The external sensors 231 may include sensors for, speed, direction, air flow, distance to the station, weather conditions, track grade etc. Contemplated is that the processor 251 of FIG. 2B and FIG. 2C may communicate with the train 219 wirelessly.

Figure 3:
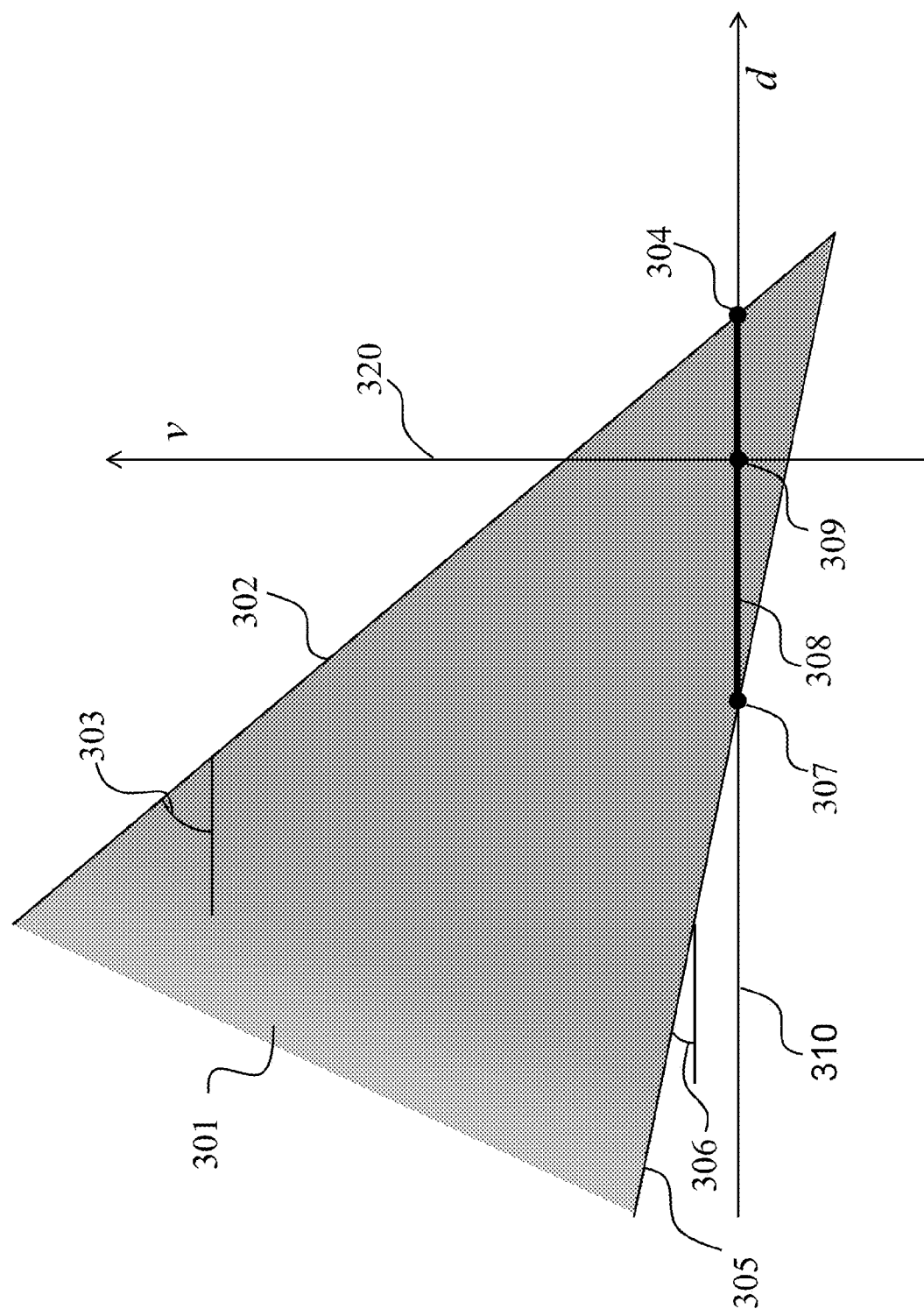
FIG. 3 is a schematic illustrating a feasible region for the movement of the train defined by linear stopping constraints, according to one embodiment of the present disclosure.

FIG. 3 is a schematic illustrating a feasible region 301 for the movement of the train defined by linear stopping constraints, according to one embodiment of the present disclosure. In this embodiment, the upper curve is a first line 302 with a first slope 303, and the lower curve is a second line 305 with a second slope 306 and the first slope 303 is greater than the second slope 306. This embodiment simplifies the selection of the stopping constraints in determining the feasible region for stopping the train.

For example, the constraints can be written in a linear form according to $$v(t) \leq \gamma_{max}(\varepsilon_{max} - d(t))$$

$$v(t) \geq \gamma_{min}(\varepsilon_{min} - d(t)), \quad (2)$$

wherein $\gamma_{max}$, $\gamma_{min}$ are two coefficients where $\gamma_{min} > 0$, $\gamma_{max} > \gamma_{min}$. If the constraints in (2) are satisfied at any time instants, then the train stops between $\varepsilon_{max}$ and $\varepsilon_{min}$.

A cone-shaped a region 301 in the space of train positions 310 and train velocities 320 is referred herein as a soft landing cone. The region 301 is delimited by two lines, each corresponding to one of the equations in (2), satisfied with equality. The upper border 302 of the soft landing cone is defined by $\gamma_{max}$ and $\varepsilon_{max}$ where $\gamma_{max}$ determines the slope 303 and $\varepsilon_{max}$ determines the intersect 304 of the upper border with the line of 0 velocity. Similarly, the lower border 305 of the soft landing cone is defined by $\gamma_{min}$ and $\varepsilon_{min}$ where $\gamma_{min}$ determines the slope 306 and $\varepsilon_{min}$ determines the intersect of 307 the lower border with the line of zero velocity.

If the train positions and velocities remain in the soft landing cone the train stops at the stopping range. The parameters $\varepsilon_{max}$ and $\varepsilon_{min}$ define the desired stopping range, because the train stops in the area 308 between positions $\varepsilon_{max}$ and $\varepsilon_{min}$ including the stopping position 309 with d=0.

In addition, some variations of this embodiment determine the parameters $\gamma_{max}$ and $\gamma_{min}$ using the desired timing to stop. For example, the embodiment can select the first slope 303 based on a minimal stopping time, and select the second slope 306 based on a maximal stopping time.

Figure 4:
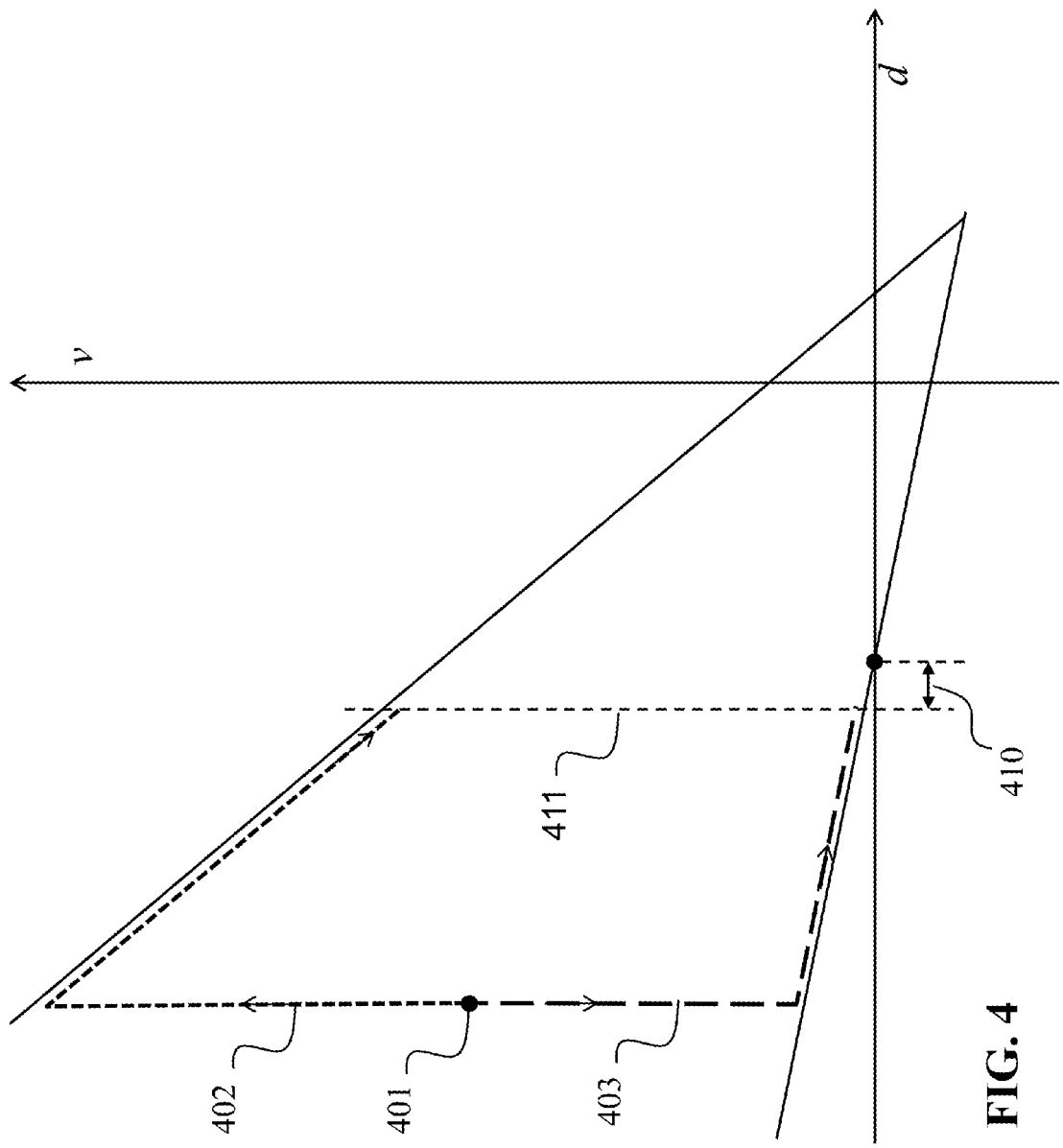
FIGS. 4 and 5 are graphs that illustrate plots for selecting the parameters of the stopping constraints based on a desired time of arrival of the train, according to one embodiment of the present disclosure.
Figure 5:
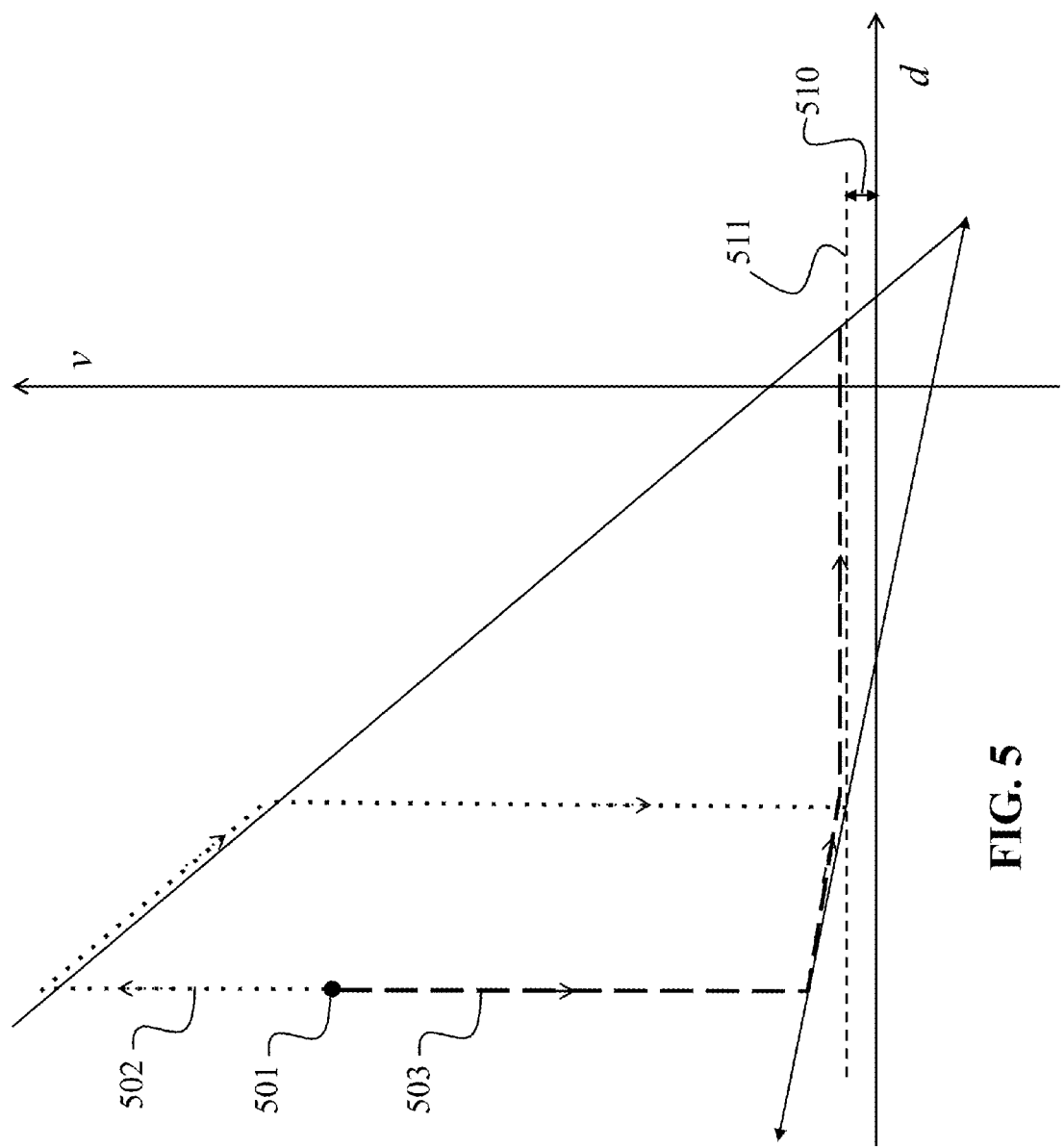

FIGS. 4 and 5 are graphs that illustrate plots for selecting the parameters of the stopping constraints based on desired time of arrival of the train. As shown in FIG. 4, for given $\gamma_{max}$, $\gamma_{min}$, and initial position 401 d(0), for any $\rho>0$ defining a tolerance to the acceptable range of stop positions 410, the line d=$\varepsilon_{min}$-$\rho$, 411, in the soft landing cone is reached in the time interval $$\hat{t} \in \left[ \frac{1}{\gamma_{max}} \log\left( \frac{\varepsilon_{max} - d(0)}{\varepsilon_{max} - \varepsilon_{min} + \rho} \right), \frac{1}{\gamma_{min}} \log\left( \frac{\varepsilon_{min} - d(0)}{\rho} \right) \right] \quad (3)$$

wherein the upper and lower bounds correspond to corresponds to the time of the sequence of positions and velocities described by a line 402 for the upper bound and by a line 403 for the lower bound.

Similarly, as shown in FIG. 5, for given parameters $\gamma_{max}$, $\gamma_{min}$, and initial position 501 d(0), for any $\sigma>0$ defining a tolerance to the stop velocity 510, the line v=$\sigma$ 511 in the soft landing cone is reached at $$\hat{t}(\sigma) \in \left[ \frac{1}{\gamma_{max}} \log\left( \frac{\gamma_{max}(\varepsilon_{max} - d(0))}{\gamma_{max}(\varepsilon_{max} - \varepsilon_{min}) + \sigma \frac{\gamma_{max}}{\gamma_{min}}} \right), \right.$$

$$\left. \frac{1}{\gamma_{min}} \log\left( \frac{\gamma_{min}(\varepsilon_{min} - d(0))}{\sigma} \right) + \frac{\varepsilon_{max} - \varepsilon_{min}}{\sigma} + \left( \frac{1}{\gamma_{min}} - \frac{1}{\gamma_{max}} \right) \right] \quad (4)$$

which corresponds to the sequence of positions and velocities described by a line 502 for the upper bound and a line 503 for the lower bound.

Reducing a value of the parameter $\gamma_{min}$ increases the maximum time to reach the stopping position. Increasing a value of the parameter $\gamma_{max}$ decreases the minimum time to reach the stop. Also, taking $\gamma_{max}$ and $\gamma_{min}$ with closer values reduces the difference between minimum and maximum time to stop, while on the other hand reduces the area of the soft landing cone which amounts to reducing the number of possible train trajectories in such a cone.

Constrained Control

Constrained control of the train that enforces the constraints in (1) guarantees that the train stops in the stopping range. However, the train position and velocity depends on the actual train dynamics generated by actuating the traction and braking system of the train. Thus, some embodiments of the present disclosure determine a control system to actuate the train traction and braking system so that the train dynamics satisfies the constraints in (1).

The train dynamics can be described by $$\dot{x}(t) = f(x(t), q(t), p)$$

$$y(t) = h(x(t)) \quad (5)$$

where x is the train state, q is the train input, p are the train parameters, y=[d v] is the output vector, f describes the variation of the state as a function of the current state, current input and current parameters, and h describes the output as a function of the current state, only.

The state and input variables in (5) are subject to the constraints $$x \in \chi \quad (6)$$

$$q \in Q \quad (7)$$

where (6) define a set of admissible values for the state variables, and (7) defines a finite set of admissible values for the input variables in (5).

In one embodiment of the present disclosure, for a train provided with rolling stocks (wheels) the train dynamics (5) is described by an affine model obtained by considering a velocity-affine model for the resistance force to motion, $$F_{res}(t) = -c_0 \mu g - c_1 v(t) \quad (8)$$

where $c_0$ is the coefficient of the constant term which models rolling resistance, and $c_1$ is the coefficient of the linear term which models bearing friction and air resistance at low speeds, $\mu$ is the friction coefficient between the rails and the rolling stocks, g is the gravity acceleration constant. In this embodiment the train dynamics is described by $$\dot{d}(t) = v(t) \quad (9)$$

$$\dot{v}(t) = \frac{k_a}{rm} \chi(t) - \frac{c_0 \mu g}{m} - \frac{c_1}{m} v(t)$$

$$\dot{\chi}(t) = -\frac{1}{\tau_a} \chi(t) + \frac{1}{\tau_a} q(t)$$

where m is the train mass, r is the radius of the wheels, $k_a$ is the maximum force, $\tau_a$ is the actuator time constant.

The affine model of the train dynamics is $$\dot{x}(t) = A(p)x(t) + B(p)q(t) + B_w w(p) \quad (10)$$

where the state is x=[d v $\chi$]' the input q is the command to the force generating actuators from traction (when positive) and braking (when negative), w is the constant resistance term obtained from (9) and the matrices A(p), B(p), are obtained also from (9), where the vector of parameters p include the train mass, the friction coefficient, the gravity acceleration constant, the maximum force, the actuator time constant. In model (10)

$$B_w = \begin{bmatrix} 0 \\ -1 \\ 0 \end{bmatrix}, \quad w(p) = \frac{c_0 \mu g}{m}. \quad (11)$$

In other embodiments of the present disclosure, the disturbance w will include the quantization errors produced by replacing the control input q from the finite set of values $Q$ with a continuous input u from a convex set $\mathcal{U} \supseteq \text{conv}(Q)$ and a quantization error w=q-u.

The train control system selects the values for the train input function q that generates admissible solution for $$\dot{x}(t)=f(x(t),q(t),p)$$

$$y(t)=h(x(t))$$

$$v(t) \leq \Gamma_{max}(\varepsilon_{max}-d(t))$$

$$v(t) \geq \Gamma_{min}(\varepsilon_{min}-d(t)$$

$$x(t) \in \chi, q(t) \in \mathcal{Q} \quad (12)$$

where the set $\chi$ describe admissible values for the state (e.g., maximum and minimum velocity, etc.), the set $\mathcal{Q}$ describes a finite set of admissible values for the input, and the solution is sought from current time T for all times in the future (i.e., $[T, t_f]$, where $t_f=\infty$).

For instance, the constraint $$\dot{v} \leq 0$$

which imposes that the train constantly decelerates, i.e., no increase in velocity is allowed, or its relaxed form $$\dot{v} \leq \psi(-d)$$

where $\psi$ is a nonnegative, monotonically decreasing function, while $d<0$ relaxes the previous constraints by allowing greater acceleration when the train is closer to the stopping position, to improve accuracy of the control.

Some embodiments of the present disclosure, optimizing the movement of the train from the current state to subsequent states, and determine a solution to (12) by solving the constrained optimal control problem $$\min F(x(t_f))+\int_{t_0}^{t_f} L(x(t),q(t))dt$$

$$s.t \; \dot{x}(t)=f(x(t),q(t),p)$$

$$y(t)=h(x(t))$$

$$v(t) \leq \Gamma_{max}(\varepsilon_{max}-d(t))$$

$$v(t) \geq \Gamma_{min}(\varepsilon_{min}-d(t))$$

$$x(t) \in \chi, q(t) \in \mathcal{Q}$$

$$x(t)=x_0 \quad (13a)$$

where $t_0$ is the initial time, $x_0$ is the state at the initial time, F is the terminal cost function and L is the stage cost function. If the problem in (13) can be solved for final time $t_f=\infty$, then the stopping constraints are always satisfied and the train stops where required.

However, the problem described in Equations (12) and (13a) requires the computation of an infinitely long sequence of control inputs q(t) for a system subject to an infinite number of constraints are difficult to solve in the train control system directly. Thus, some embodiments solve the problem in described in Equations (12) and (13a) in a receding horizon fashion.

Figure 6:
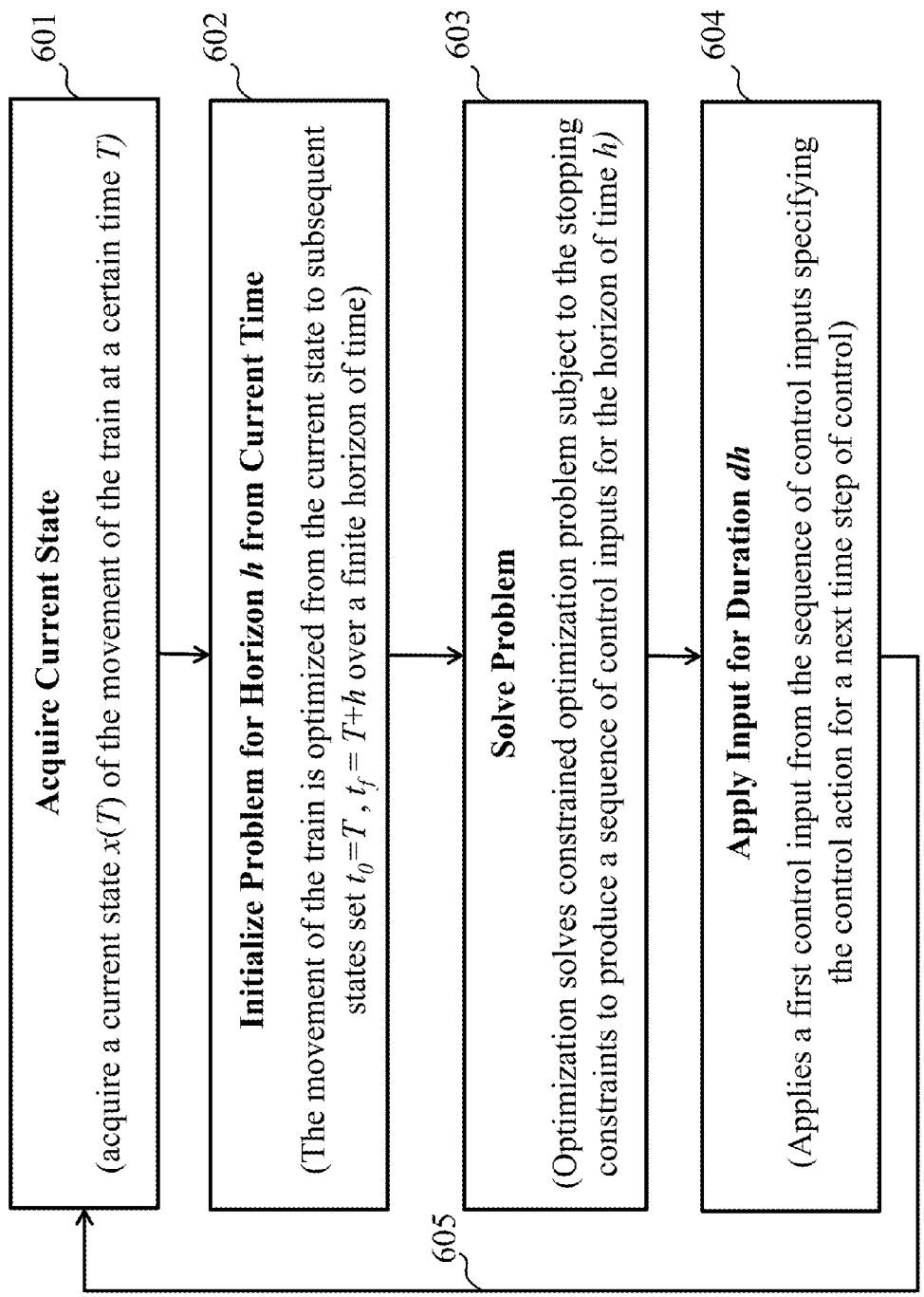
FIG. 6 is a block diagram of a method for predictive constrained control, according one embodiment of the present disclosure.

FIG. 6 is a block diagram of a method for predictive constrained control according one embodiment of the present disclosure. The method determines 601 a current state x(T) of the movement of the train at a certain time T, and the movement of the train is optimized 602 from the current state to subsequent states set $t_0=T$, $t_f=T+h$ over a finite horizon of time. The optimization 603 solves the constrained optimization problem subject to the stopping constraints to produce a sequence of control inputs for the horizon of time h.

The method selects and applies 604 a first control input from the sequence of control inputs specifying the control action for a next time step of control. For example, the finite horizon control input signal q is applied during the time interval [T, T+dh]. Then 605, at time $t_0$+dh, where dh<h a new problem is solved with $t_0$=T+dh, $t_f$=T+dh+h and the newly computed input signal is applied, and the steps of the method are iteratively repeated.

When the optimization problem (13a) directly choses a control input q from the finite set of values $\mathcal{Q}$ it is called a mixed-integer optimization problem. Mixed integer optimization problems can be difficult to solve in the small time window dh between updates to the control input q. Thus some embodiments of the present disclosure select an input u from a bounded convex set $\mathcal{U} \supseteq \text{conv}(\mathcal{Q})$ by solving a convex optimization problem $$\min F(x(t_f))+\int_{t_0}^{t_f} L(x(t),u(t))dt$$

$$s.t. \; \dot{x}(t)=f(x(t),u(t)-w(t),p)$$

$$y(t)=h(x(t))$$

$$v(t) \leq \Gamma_{max}(\varepsilon_{max}-d(t))$$

$$v(t) \geq \Gamma_{min}(\varepsilon_{min}-d(t))$$

$$x(t) \in \chi, u(t) \in \mathcal{U} \text{ for all } w(t) \in \mathcal{W}$$

$$x(t_0)=x_0 \quad (13b)$$

and then applying a quantization rule q: $\mathcal{U} \to \mathcal{Q}$ to obtain a feasible input $q(t)=q(u(t)) \in \mathcal{Q}$ in the finite set of values $\mathcal{Q}$. The difference w(t)=u(t)−q(u(t)) between the convex input u(t) and the quantized input $q(t)=q(u(t)) \in \mathcal{Q}$ is called the quantization error. The set of possible quantization errors w produced by the quantization rule q can be bounded by a set $\mathcal{W}$ since $\mathcal{U} \supseteq \text{conv}(\mathcal{Q})$ is bounded. The optimization problem (13b) is solved robustly, that is, in a manner such that any quantization error w that satisfies the bounds $\mathcal{W}$ will not cause a constraint violation. Thus the quantizing the convex input $q(t)=q(u(t)) \in \mathcal{Q}$ does not produce constraint violations even though the optimization problem (13b) does not known the actual value of the quantization error w.

Control Invariant Subset

Figure 7A:
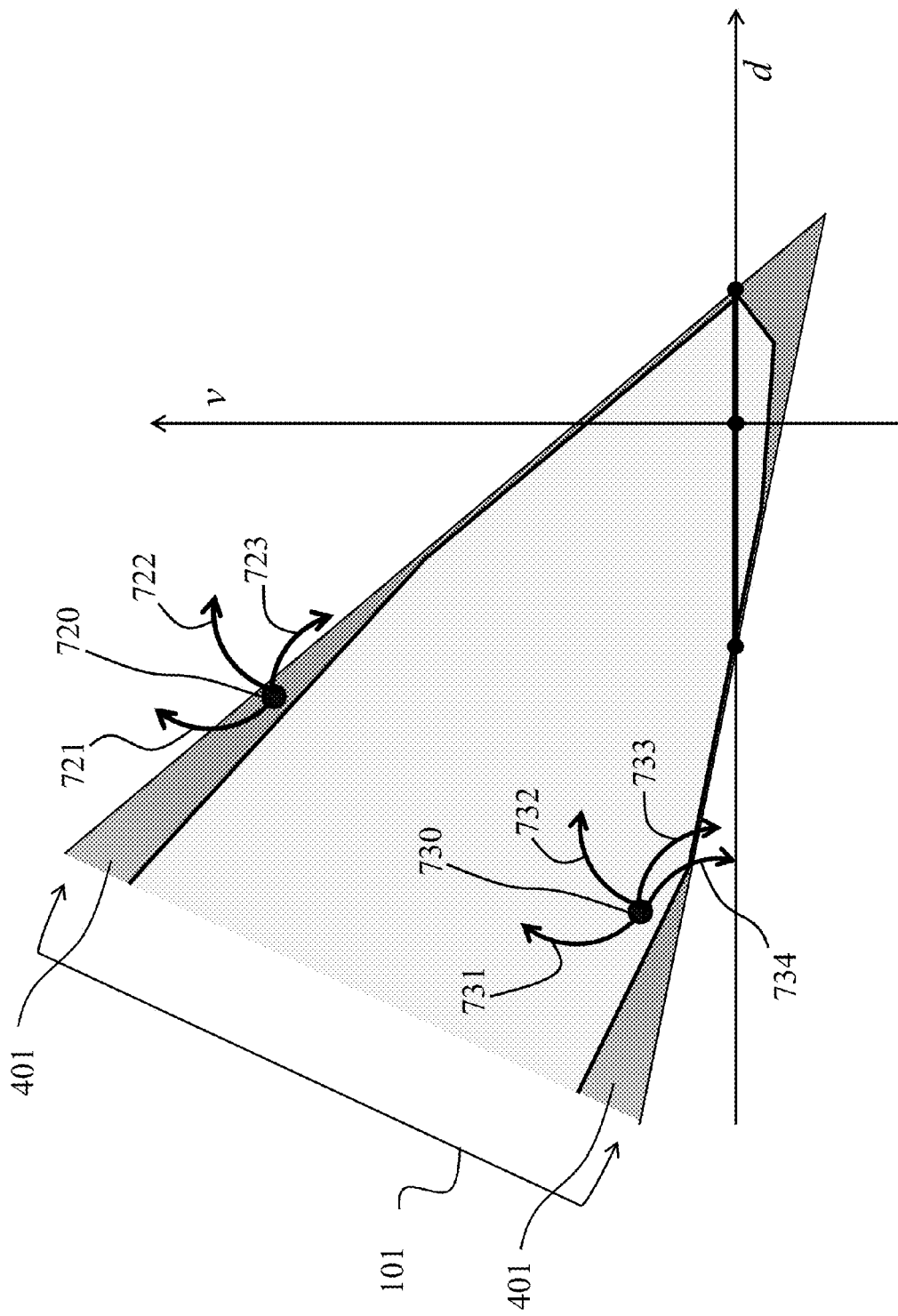
FIG. 7A is a schematic illustrating a control invariant subset of the feasible region, according one embodiment of the present disclosure.

FIG. 7A is a schematic illustrating a control invariant subset of the feasible region and selection of a control action maintaining a state of the train within a control invariant subset. According to various embodiments of the present disclosure, for each state within the control invariant subset there is at least one control action in the finite set of values maintaining the state of the train within the control invariant subset.

Due to the nature of receding horizon control, the existence of a solution for a certain horizon does not by itself guarantees the existence of the solution for a subsequent horizon. Specifically, while the receding horizon solution makes the problems (13a) and (13b) computationally feasible, it is not possible to guarantee that such problem always has a solution. In particular, it is possible that the problem (13a) or (13b) solved at time T has a solution, but the one to be solved at time T+dh does not. This is due to the fact that as the horizon is shifted, the constraints in (2), (6), (7) have to be enforced on a new piece of the trajectory, i.e., during the time interval [T+h, T+dh+h] that was not account for before.

For example, the state of the machine and a state of the train 720 can be optimal and feasible for one iteration, but all control actions 721-723 that controller is allowed to take during the next iteration can bring a state of the train outside of the feasible region 101.

Some embodiments of the present disclosure are based on yet another realization that it is possible to select a subset 401 of the feasible region 101, such that from any state of the train within that subset, there is a control action in the finite set of values maintaining the state of the train within the subset. For example, for any state such as a state 730 within the subset 401 and within all possible control actions 731-734 that the controller can execute, there is at least one control action in the finite set of values, e.g., actions 731 and 732, that maintains the state of the train within the control invariant subset 410.

Accordingly, if a control action for controlling the operation is selected such that the state of the train remains in that special subset 401 of the feasible region, and the feasible region is generated also according to Equation (1), then there is a guarantee that it is possible to determine the sequence of control actions forming an ad-hoc run-curve leading the train from the current position to the stopping position.

For example, one embodiment determines a discretized version of the problem in (13) by considering a sampling period dh and obtaining a discrete time model for the dynamics in (5) which is $$x(t+dh) = f_d(x(t), q(t), p)$$

$$y(t) = h_d(x(t)) \quad (14)$$

wherein given a state x and a quantized control input q, $f_d(x, q, p)$ is the updated state. Based on the discrete time model, the constrained control is $$\min F(x(N)) + \sum_{k=0}^{N} L(x(k), q(k)) \quad (15a)$$

s.t.

$$x(k+1) = f_d(x(k), q(k), p)$$

$$y(k) = h(x(k))$$

$$v(k) \leq \Gamma_{max}(\varepsilon_{max} - d(t))$$

$$v(k) \geq \Gamma_{min}(\varepsilon_{min} - d(t))$$

$$x(k) \in \chi, q(k) \in \mathcal{Q}$$

$$x(0) = x_0$$

wherein x(k+i) is the predicted state value at time t+i dh, x(t+i dh). At any time t of the control one embodiment solves the problem (15a) on the future interval [t, t+N dh] and a first control input q(0) from the sequence of control inputs specifying the control action for a next time step of control is applied during [t, t+dh] then the new state x(t+dh) is read and a new problem is solved.

Problem (15a) is a mixed-integer optimization problem. Some embodiments solve the convex optimization problem $$\min F(x(N)) + \sum_{k=0}^{N} L(x(k), u(k) - w(k)) \quad (15b)$$

s.t.

$$x(k+1) = f_d(x(k), u(k) - w(k), p)$$

$$y(k) = h(x(k))$$

$$v(k) \leq \Gamma_{max}(\varepsilon_{max} - d(t))$$

-continued $$v(k) \geq \Gamma_{min}(\varepsilon_{min} - d(t))$$

$$x(k) \in \chi, u(k) \in \mathcal{U} \text{ for all } w(k) \in \mathcal{W}$$

$$x(0) = x_0$$

and apply a quantization rule q: $\mathcal{U} \rightarrow \mathcal{Q}$ to obtain a feasible input q(k)=q(u(k))∈$\mathcal{Q}$ in the finite set of values $\mathcal{Q}$. At any time t of the control, one embodiment solves the problem (15b) on the future interval [t, t+N dh] and a first control input q(0)=q(u(0)) from the sequence of control inputs specifying the control action for a next time step of control is applied during [t, t+dh] then the new state x(t+dh) is read and a new problem is solved.

Problems (15a) and (15b) are not guaranteed to be feasible. However, some embodiments modify the constraints to guarantee the feasibility. The set of the feasible states $\chi_f$ is the set that includes all the values for the state x satisfying the Equations (2), (6), (7). The control invariant subset $c$ of the set of feasible states used by some embodiments is control invariant with respect to dynamics (14) and constraints (2), (6), (7) that is, if for every x∈$c$, there exists a value q∈$\mathcal{Q}$ such that $f_d(x, q, p) \in c$.

Accordingly, some embodiments select a control action for the movement of the train by solving the mixed-integer optimization problem $$\min F(x(N)) + \sum_{k=0}^{N} L(x(k), q(k)) \quad (16a)$$

s.t.

$$x(k+1) = f_d(x(k), q(k), p)$$

$$y(k) = h(x(k))$$

$$x(k) \in \mathcal{C}, q(k) \in \mathcal{Q}$$

$$x(0) = x_0.$$

If x(t)∈$c$ then the modified problem is feasible, and when the input q is applied to the train, the problem generated at the next time step t+dh is going to be feasible because x(t+dh)=$f_d$(x(t), q(t), p)∈$c$. Thus, if the first problem generated when the controller is initialized is feasible, the generated trajectory always satisfies constraints (2) and hence the train stops where required.

In other embodiments, the control input is obtained by solving the convex optimization problem $$\min F(x(N)) + \sum_{k=0}^{N} L(x(k), u(k)) \quad (16b)$$

s.t.

$$x(k+1) = f_d(x(k), u(k), p)$$

$$y(k) = h(x(k))$$

$$x(k) \in \mathcal{C}, u(k) \in \mathcal{U}$$

$$x(0) = x_0$$

and applying a quantization rule q: $\mathcal{U} \rightarrow \mathcal{Q}$ to obtain a feasible input q(t)=q(u(t))∈$\mathcal{Q}$ in the finite set of values $\mathcal{Q}$. The set $c$ is control invariant for the quantization rule q: $\mathcal{U} \rightarrow \mathcal{Q}$ if for every x∈$c$, there exists a value u∈$\mathcal{U}$ such that $f_d$(x, u−w, p)∈$c$ for every possible quantization error w∈$\mathcal{W}$.

Robust Control Invariant Set for Quantization Errors

In some cases, the values of the variables in the parameter vector p in (5) are not exactly known. For instance, only an upper and lower bound may be known, or more generally that the parameter vector p has one of the values in a set P, which may also be constantly changing within this set.

It is realized that the control strategy can be modified to guarantee precise stopping in the presence of constraints by ensuring that the constraints in (2), (6), (7) are satisfied at any time instant for all value of the parameter vector. For example, some embodiments determine the control invariant subset for a set of possible parameters of the train, such that for each state within the control invariant subset, there is at least one control action maintaining the state of the train within the control invariant subset for all parameters from the set of possible parameters of the train.

To this end in place of the set $c$ in (16), some embodiments use the set $c(P)$, which is a subset of $\chi_f$ such that for all states x that are in $c(P)$, there exists an input $q \in \varrho$ such that $f_d(x, q, p) \in c(P)$, for all the values p in P.

Thus the problem for stopping the train with uncertain parameter values and quantization errors is $$\min F(x(N)) + \sum_{k=0}^{N} L(x(k), q(k)) \quad (17a)$$

s.t.

$x(k+1) = f_d(x(k), q(k), \hat{p})$ $y(k) = h(x(k))$ $x(k) \in \mathcal{C}(P), q(k) \in \mathcal{Q}$ $x(0) = x_0$ where estimate of the unknown parameter $\hat{p} \in P$ may not be the actual value. However the design of the control invariant set $c(P)$, which incorporates uncertainty in the parameters P, guarantees that the train state remains in the feasible region.

It can be difficult to compute a control invariant set $c(P)$ when the input set $\varrho$ is finite or a finite set of values. Thus some embodiments instead compute a control invariant set for a particular quantization rule. A set $c(P, \mathcal{W})$ is control invariant for some quantization rule q: $\mathcal{U} \to \varrho$ if for every $x \in c(P, \mathcal{W})$ there exists $u \in \mathcal{U}$ such that $f_d(x, u-w, p) \in c$ for any quantization error $w \in \mathcal{W}$. Thus the problem for stopping the train with uncertain parameter values and quantization errors is $$\min F(x(N)) + \sum_{k=0}^{N} L(x(k), u(k)) \quad (17b)$$

s.t.

$x(k+1) = f_d(x(k), u(k), \hat{p})$ $y(k) = h(x(k))$ $x(k) \in \mathcal{C}(P, \mathcal{W}), u(k) \in \mathcal{U}$ $x(0) = x_0$ where estimate of the unknown parameter $\hat{p} \in P$ may not be the actual value. The control invariant set $c(P, \mathcal{W})$ incorporates uncertainty in the parameters P and bounds on the quantization error $\mathcal{W}$ to guarantee that the train state remains in the feasible region.

If $x(t) \in c(P, \mathcal{W})$ then the modified problem is feasible, and when the input q=u−w is applied to the train, the problem generated at the next time step t+dh is also feasible because $x(t+dh) \in c(P, \mathcal{W})$ for all real values of p in P and the quantization error w in $\mathcal{W}$. Thus, if the first problem generated when the controller is initialized is feasible, the generated trajectory always satisfies constraints in (2), (6), (7) and hence the train stops where required.

Figure 7B:
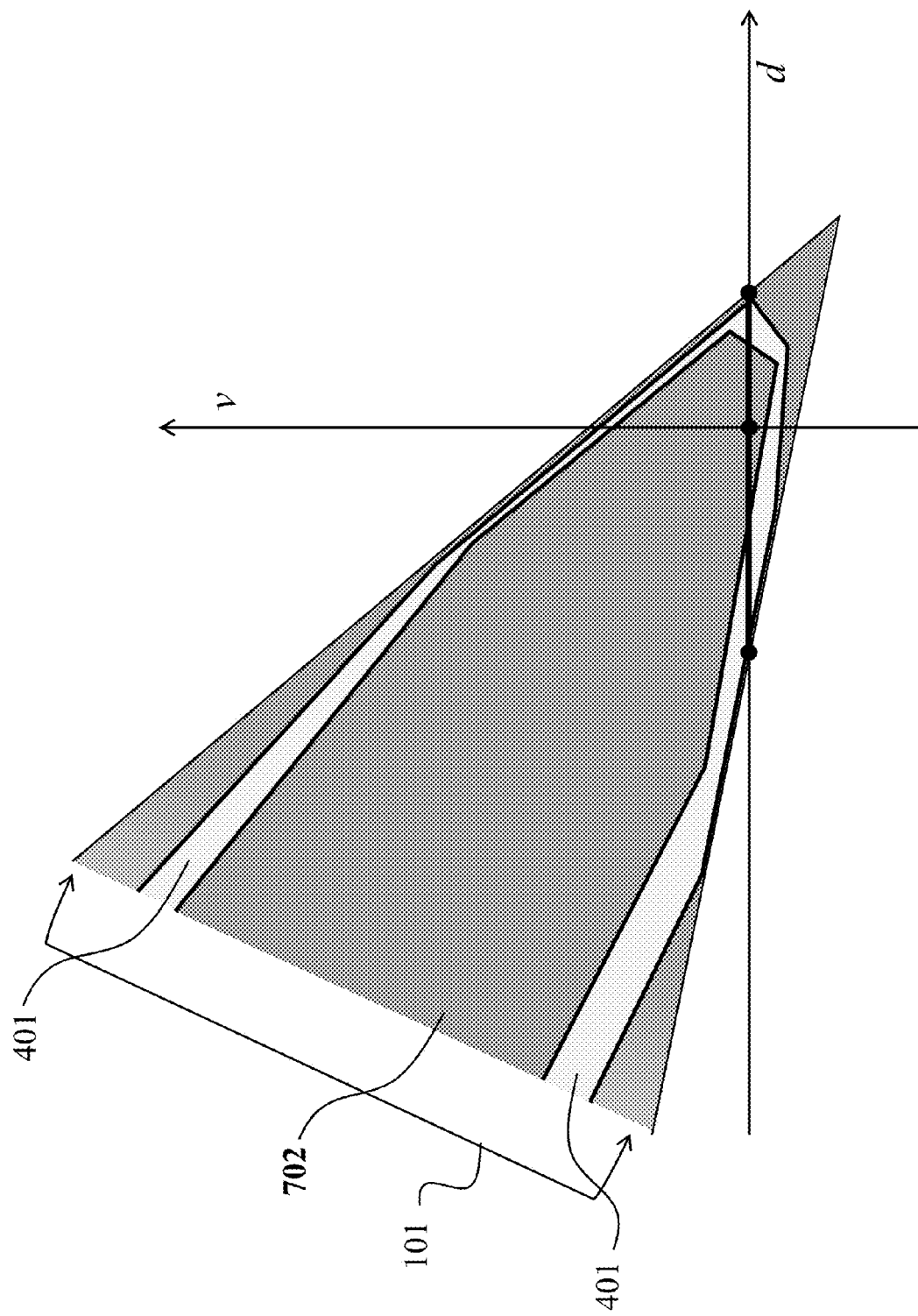
FIG. 7B is a schematic illustrating the relation between different feasible regions, according one embodiment of the present disclosure.

FIG. 7B is a schematic illustrating the relation between different feasible regions. Then the feasible regions 101 includes the control invariant set 401, which in turn include the control invariant set 702 for a set of possible parameters of the train.

Control Invariant Set Computation

Figure 8A:
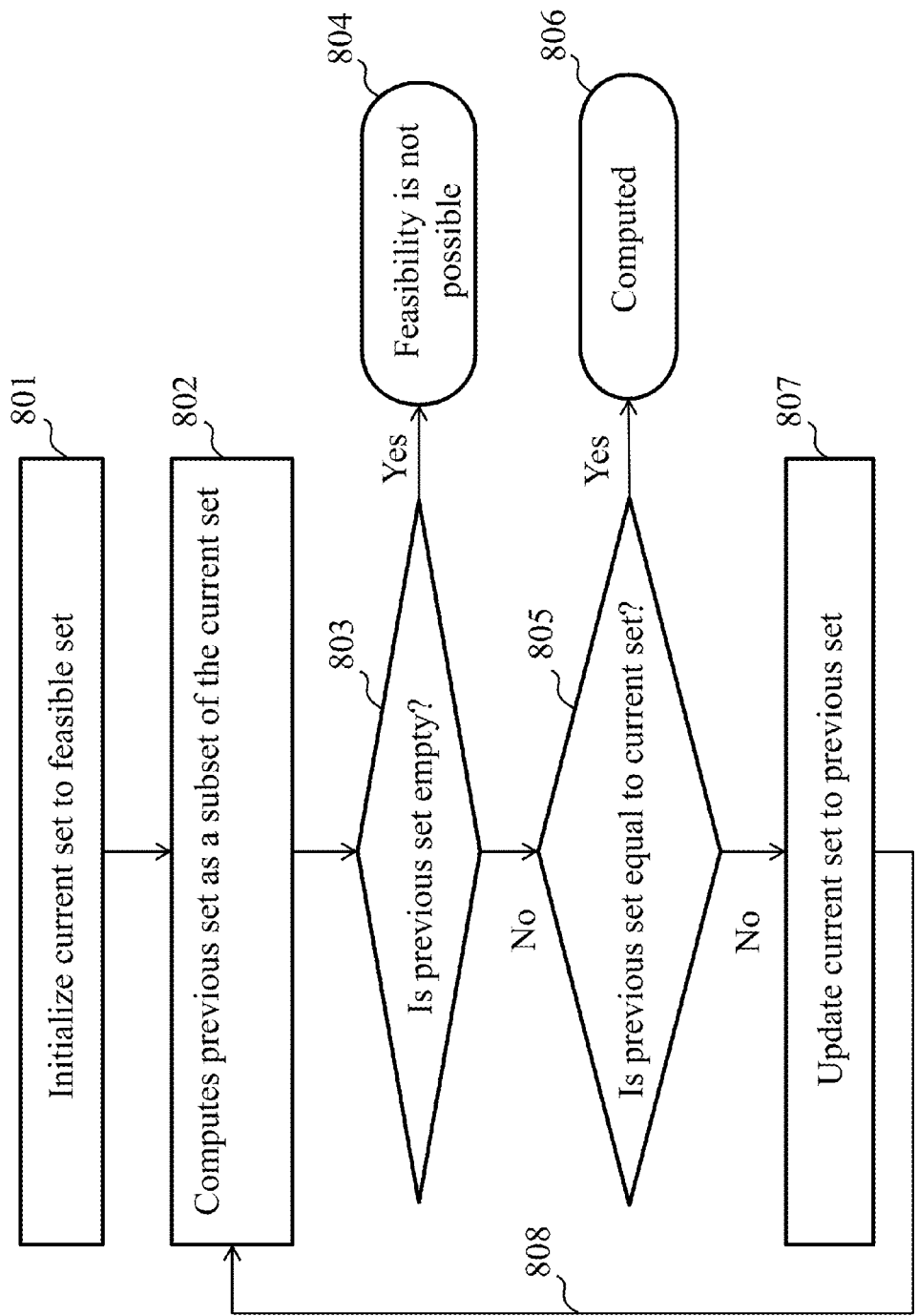
FIG. 8A is a block diagram illustrating a backward-reachable region computation for determining the control invariant subset starting from the feasible region, according one embodiment of the present disclosure.

FIG. 8A is a block diagram illustrating a backward-reachable region computation for determining the control invariant subset starting from the feasible region. The backward-reachable region computation determines the set $c(P)$, for uncertainty set P. The set $c(P)$ can be generated by the same computation where the set P includes only a single value.

The backward-reachable region computation initializes 801 a current set $\chi_c$ to the feasible set $\chi_f$ and determines 802 a predecessor set of states $\chi_p$ as a subset of the current set $\chi_c$ such that for all states x in $\chi_p$ there exists an input q in $\varrho$ such that for all the possible values of the parameters p in P, the updated state lies in the current set $\chi_c$.

If 803 the predecessor set $\chi_p$ is empty, it is not possible 804 to guarantee feasibility of problem (17a), which means that it is not possible to guarantee precise stopping with the amount uncertainty P of the train parameters. If the current set 805 and the predecessor set are equal 806 then the current set $\chi_c$ is a control invariant set $c(P) = \chi_c$. Otherwise the predecessor set $\chi_p$ is assigned 807 to be the current set $\chi_c = \chi_p$ and the computation iterates 808 again.

Figure 8B:
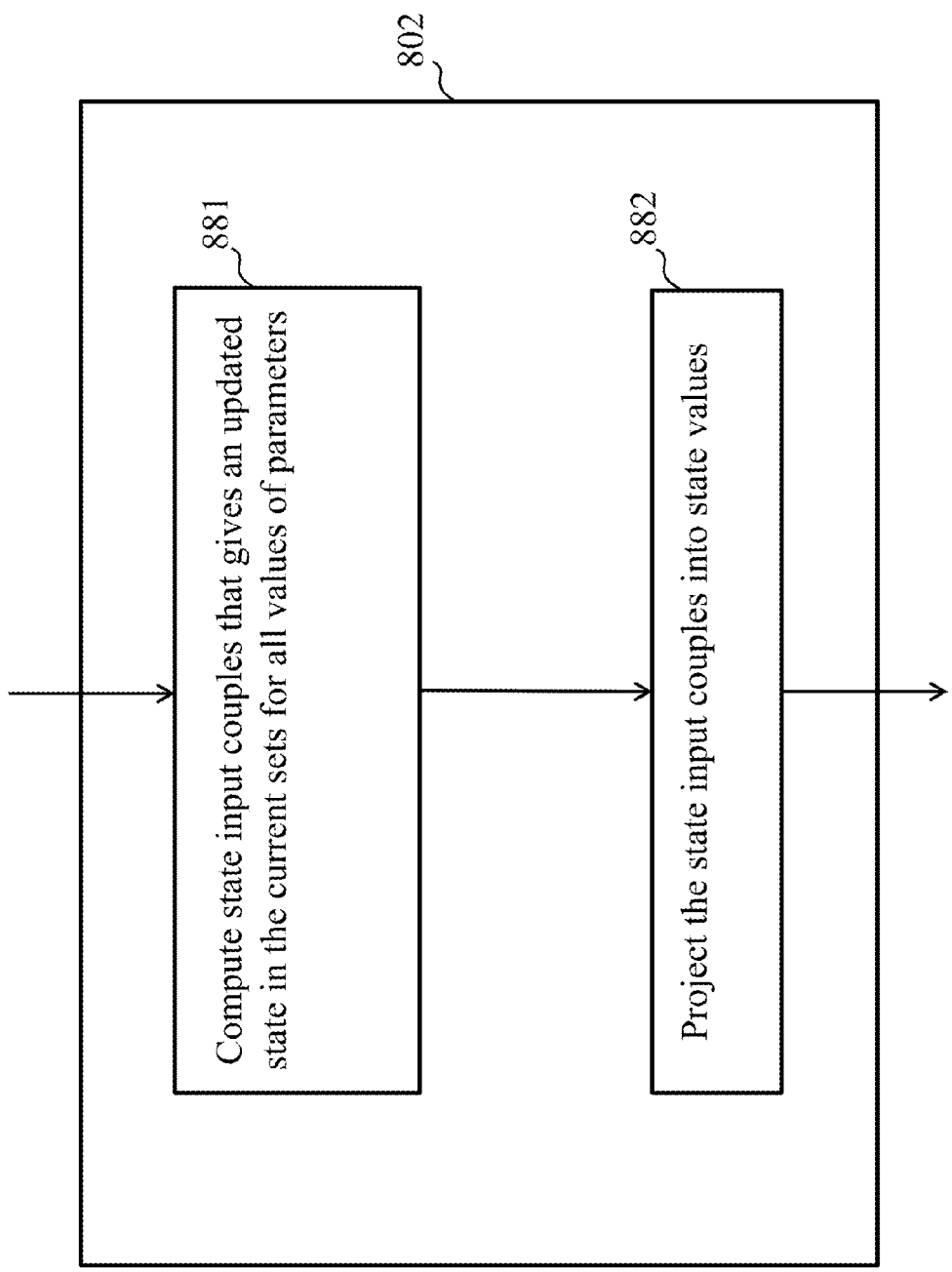
FIG. 8B is a block diagram illustrating of at least one implementation of determining the predecessor set of states, according one embodiment of the present disclosure.

FIG. 8B shows a block diagram illustrating an implementation of determining 802 the previous set of states of FIG. 8A, according to one embodiment. The implementation of determining 802 the previous set of states includes identifying 881 the state-input couple that generates an updated state that is in the current set for all the values of the parameters, and projects 882 the state input couples into state values, i.e., the embodiment identifies the states that belongs to at least one of such state-input couples.

The algorithm in FIG. 8A can be difficult to execute when the input set is finite, i.e. finite set of values $\varrho$. Accordingly some embodiments of the present disclosure, replace the finite input set of values $\varrho$ with a polyhedral set $\mathcal{U} \supseteq \text{conv}(\varrho)$ and a quantization rule q: $\mathcal{U} \to \varrho$ that maps the convex input $u \in \mathcal{U}$ to a quantized value $q(u) \in \varrho$. The quantization error is the difference w=u−q(u) between the convex input $\mathcal{U}$ and the quantized input $q=q(u) \in \varrho$. The algorithm shown in FIG. 8A can be modified to use the bounds on the quantization error $\mathcal{W}$ to construction a control invariant set that is robust to quantization errors. The set of possible quantization error can be over-bounded by a set $\mathcal{W}$.

Figure 9A:
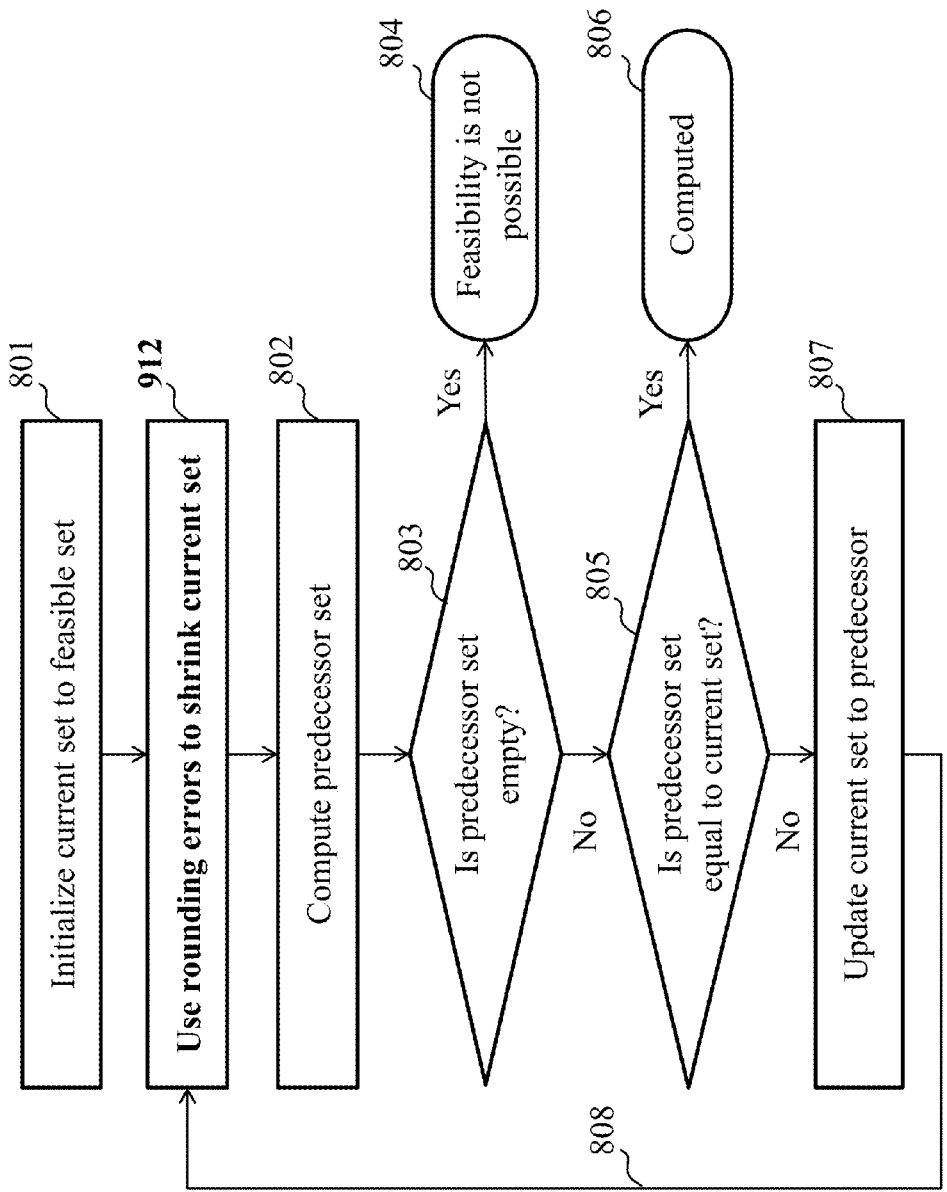
FIG. 9A is a block diagram of a method for computation of some couples of states-inputs, according one embodiment of the present disclosure.

FIG. 9A is a block diagram of a method for a modification to the algorithm in FIG. 8A for computing a control invariant set for a particular quantization rule q: $\mathcal{U} \to \varrho$ and the set that bounds quantization errors $\mathcal{W}$ generated by q. The difference between the algorithm in FIG. 8A and the algorithm in FIG. 9A is that the current set $\chi_c$ is shrunken using the quantization error set $\mathcal{W}$ 912 at the beginning of each iteration. This ensures that the states in the predecessor set $\chi_p$ can be mapped into the current set $\chi_c$ no matter what the value quantization error w assumes in the set $\mathcal{W}$.

The computation of the backward-reachable set can be simplified when the constraint sets $\chi_f$, $\mathcal{U}$ and $\mathcal{W}$ are polyhedral and the parameter dependent dynamics are described by a set of linear models $$f(x,q,p) \in \text{conv}(\{A_i x(k) + B_i q(k)\}_{i=1}^l) \quad (18)$$

where the matrices $A_i$ and $B_i$ capture all possible behaviors of the system for different parameter values p in P. The linear models in (18) can be computed for instance by taking the maximum and minimum of the parameters that form vector p allowed by P, and/or of their combinations. Equation (18) also covers the case where all the parameters are perfectly known, since in that case only one model is used l=1.

Figure 9B:
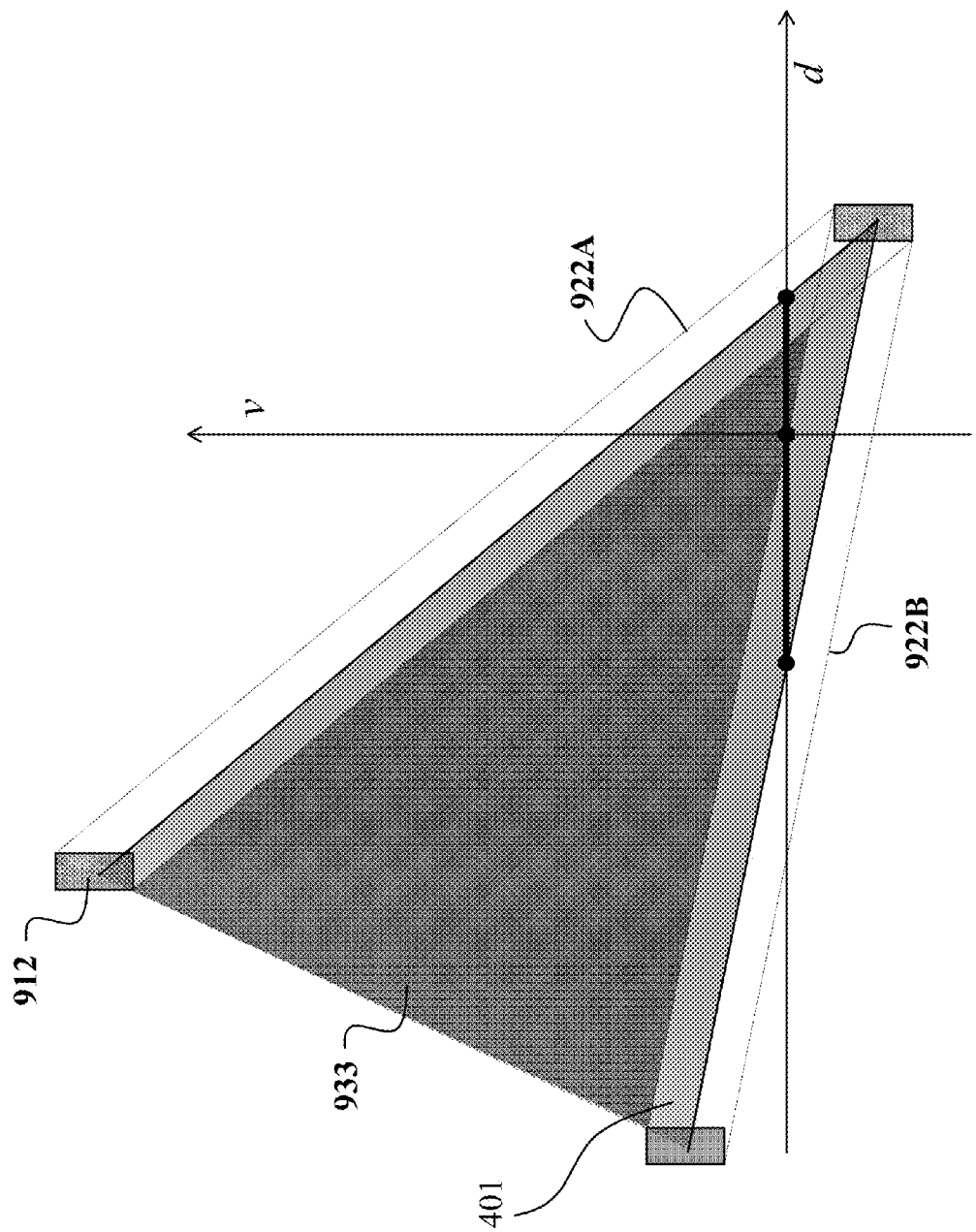
FIG. 9B is a schematic illustrating how the backward reachable sets are shrunk in order to ensure that the quantization error does not cause constraint violations, according one embodiment of the present disclosure.

FIG. 9B shows a block diagram of a method for computation of the backward-reachable set when $\chi_f$, $\mathcal{U}$ and $\mathcal{W}$ are polyhedral and the dynamics are described by (18). The method considers the current set as $$\chi_c = \{x : h_i^{(c)} x \le k_i^{(c)}, i=1,\ldots,m\}. \quad (19)$$

The worst-case quantization error wi is determined for each constraint $h_i^{(c)} x \le k_i^{(c)}$ by solving the linear optimization problem $$\overline{w}_i = \max_{w \in \mathcal{W}} H_i^{(c)} B w$$

The worse-case quantization error wi is used to shrink the current set according to $$\chi_s = \{x : h_i^{(c)} x \le k_i^{(c)} - \overline{w}_i, i=1,\ldots,m\} \quad (21)$$

Finally the predecessor set is computed by finding the set of state and input pairs (x,u) such that successive state $A_i x + B_i u \in \chi_s$ is inside the shrunken set $\chi_s$ for every extreme model i=1, . . . , l.

FIG. 9B depicts the shrinking (21) of the current set 401. The quantization error set 912 moves boundary planes 922A and 922B of the current set 401 inward to produce the shrunken set 933 given mathematically by (21).

Quantization Rule

If the train-stopping problem has too much parameter uncertainty P or the quantization errors are too large $\mathcal{W}$, then the control invariant set $c(P, \mathcal{W})$ will be empty. This means that it is not possible to guarantee precision stopping of the train for all possible values of the train parameters and all possible quantization errors. The uncertainty set P for the train parameters cannot be changed. However the set $\mathcal{W}$ that bounds the quantization errors can be changed by choosing a different quantization rule q: $\mathcal{U} \to \mathcal{Q}$. Thus, one embodiment of the present disclosure discloses a system and a method for designing a quantization rule q Q that ensures that the control invariant set $c(P, \mathcal{W})$ is not empty and therefore it is possible to stopping the train in the desired location.

Figure 10A:
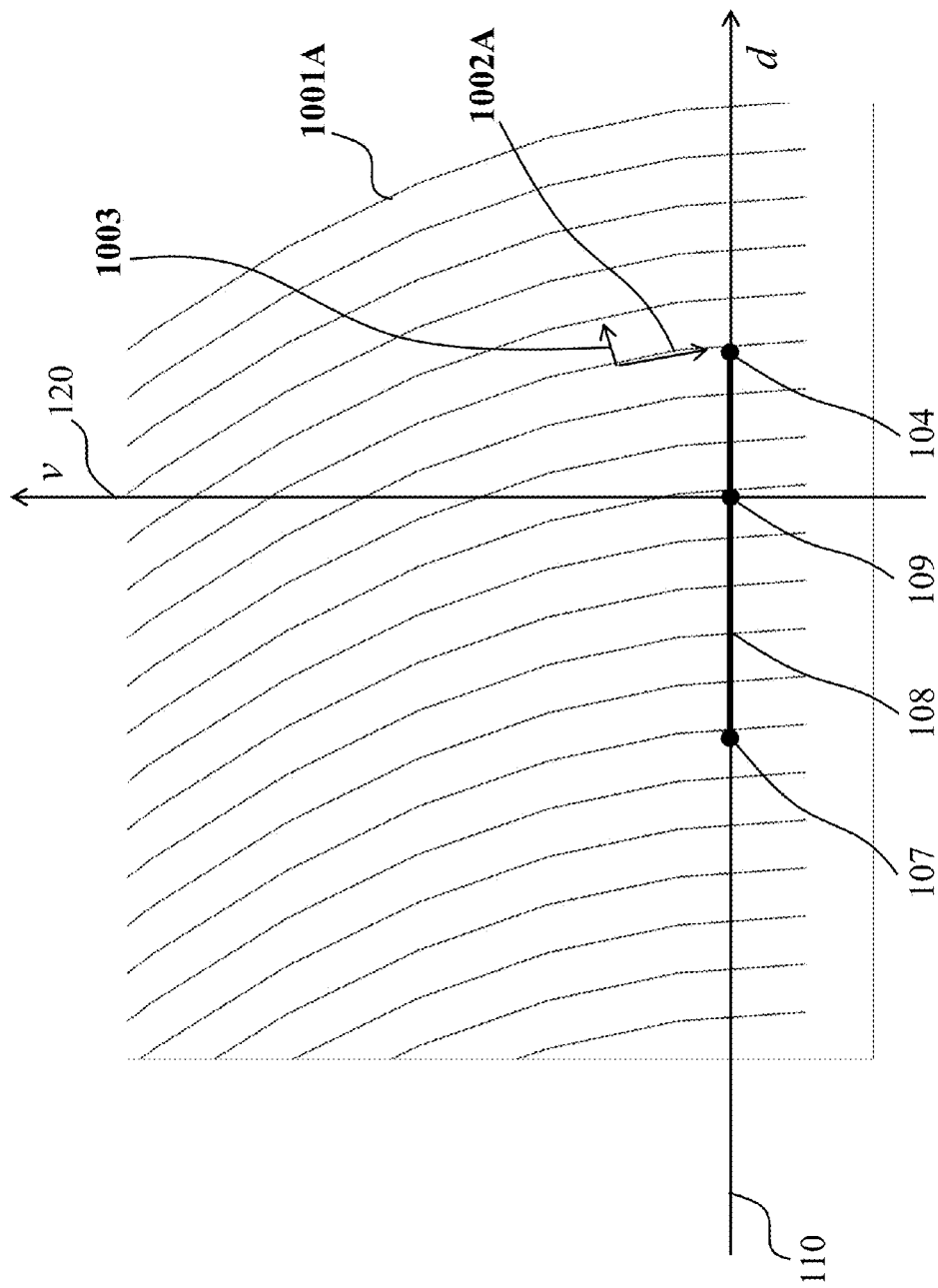
FIG. 10A is a graph illustrating an example of how the direction of the quantization error can affect stopping precision of the train through the train dynamics, according one embodiment of the present disclosure.

Referring to FIG. 10A, the embodiment is based on the realization that if the finite input set of values $q \in \mathcal{Q}$ are vectors then the quantization errors w=u−q(u) will have a magnitude and direction. It was further realized that quantization errors in different directions have different effects on the ability of the train to precisely stop. FIG. 10A shows an example of how the direction of the quantization error can affect stopping precision of the train. In this example the finite input set of values are two dimensional and therefore the quantization error is also two dimensional. 1001A shows the position 110 versus velocity 120 trajectories of the train under constant braking. The automatic train-stopping controller places the train on one of the trajectories 1001A that terminate within the desired stopping range 108 between 107 and 104. A quantization error in the direction 1003 can push the train onto an undesirable trajectory. On the other hand, a quantization error in the direction 1002A will advance the along the safe trajectory and thus has less effect on stopping precision.

Figure 10B:
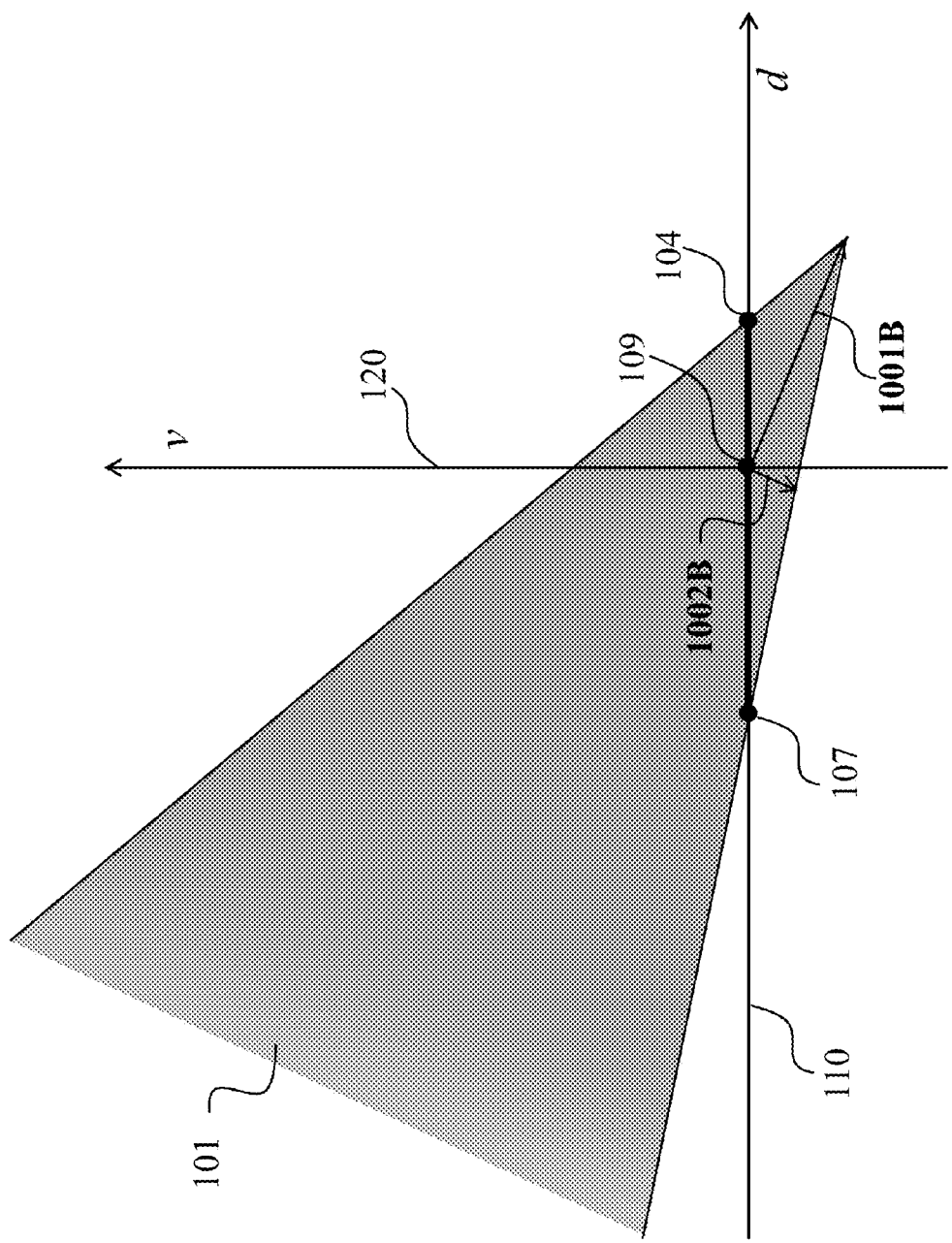
FIG. 10B is a schematic illustrating how the direction of the quantization error can affect stopping precision of the train through the train constraints, according one embodiment of the present disclosure.

FIG. 10B shows an example of how the quantization error direction can affect the ability of the train to satisfy the soft-landing constraints. FIG. 10B shows the soft-landing cone 101 from FIG. 3. The train can withstand a large quantization error in the direction 1001B without violating the soft-landing cone constraint 101. But only a relatively small quantization error in the direction 1002B will cause a constraint violation. From FIGS. 10A and 10B it is clear that the direction as well as the magnitude of the quantization errors can adversely affect stopping precision.

Accordingly, some embodiments of the present disclosure disclose a method and a system for selecting a quantization rule that produces small quantization errors in directions that can reduce stopping precision. The quantization rule is designed using an optimization problem that incorporates information about the dynamics and constraints of the train to minimize the effects of quantization error on stopping precision.

The quantization rule q: $\mathcal{U} \to \mathcal{Q}$, used by some embodiments of the present disclosure, maps the convex input $u \in \mathcal{U}$ to the "closest" element $q \in \mathcal{Q}$ in the finite set of values $\mathcal{Q}$ under some weighted "distance" function $$q(u) = \min_{q \in \mathcal{Q}} \|u - q\|_W^2 \quad (22)$$

where $\|u-q\|_W^2 = (u-q)^T W(u-q)$ is the weighted distance and $W = W^T \succ 0$ is a positive definite matrix. This quantization rule is non-obvious for two reasons. First since the weighting matrix W is not necessarily diagonal, it can be used to parameterize very non-intuitive "distance" functions. Thus the quantization rule may round the convex input $u \in \mathcal{U}$ to a finite value q(u) that is far away in terms of the intuitive Euclidean distance function. The second reason the quantization rule is non-obvious is that it is not obvious how the dynamics and constraints of the train is to be used to design the weighting matrix W in order to minimize the effects for quantization error on stopping precision.

The quantization rule (22) minimizes the size $\|w\|_W^2 = \|u - q(u)\|_W^2$ of quantization errors w=u−q(u). We call a quantization error w small if it satisfies $\|w\|_W^2 = \|u-q(u)\|_W^2 \le 1$. The weighting matrix W is be chosen such that if the quantization errors w=u−q(u) are small $\|w\|_W^2 \le 1$ then the effects on the train are small. In other words, the quantization rule is to be designed to maximize the volume of "small" quantization errors that have small effects on the train. Thus the weighting matrix W is chosen to maximize the volume of the set of small quantization errors $$\varepsilon(W) = \{w : \|w\|_W^2 \le 1\} \quad (23)$$

for which it is possible to stop the train within the desired stopping range. The set (23) is an ellipsoid parameterized by the weighting matrix W.

The constraints on the train state can be satisfied for quantization errors in the set ε(W) is there exists a linear controller $u = F_x$ that satisfies input constraints $u \in \mathcal{U}$ and keeps the state inside a subset $\mathcal{P} \subseteq \chi_f$ of the feasible region $\chi_f$. In the present disclosure, the subset $\mathcal{P}=\varepsilon(P)$ is an ellipsoid parameterized by a positive definite matrix P. The state of the train never leaves the set $\mathcal{P}=\varepsilon(P)$ for any quantization error $w\in\varepsilon(W)$ if the following matrix inequalities hold $$\begin{bmatrix} P^{-1} & (A_iP^{-1}+B_iFP^{-1})' & 0 \\ (A_iP^{-1}+B_iFP^{-1}) & P^{-1} & 0 \\ 0 & W^{-1}B_i^T & \alpha W^{-1} \end{bmatrix} \succeq 0 \quad (24a)$$

for i=1, . . . , l and some $\alpha\in(0,1)$. The set $\mathcal{P}=\varepsilon(P)$ is a subset of the feasible region $\chi_f$ if the following matrix inequalities hold $$\begin{bmatrix} P^{-1} & h_{i,x} \\ h_{i,x}^T & k_{i,x}^2 \end{bmatrix} \succeq 0 \quad (24b)$$

for each inequality $h_{i,x}x\leq k_{i,x}$ that defines the feasible region $\chi_f=\{x:h_{i,x}x\leq k_{i,x}, i=1, \ldots, m_x\}$. The linear controller $u=F_x$ that satisfies input constraints $u\in\mathcal{U}$ for every state $x\in\mathcal{P}$ if the following matrix inequalities hold $$\begin{bmatrix} P^{-1} & P^{-1}F^Th_{i,u} \\ h_{i,u}^TFP^{-1} & k_{i,u}^2 \end{bmatrix} \succeq 0 \quad (24c)$$

for each inequality $h_{i,u}x\leq k_{i,u}$ that defines the input set $\mathcal{U}=\{x:h_{i,u}x\leq k_{i,u}, i=1, \ldots, m_u\}$. Thus if there exists matrices P, F, and W that satisfy the matrix inequalities then it is possible to guarantee that the train state is feasible for any quantization error $w=u-q(u)$ in the set (23) of small quantization errors.

The larger the set of errors (23) that do not cause constraint violations, the smaller the effect of the quantiztion errors on the system. The volume of the set (23) can be maximized by solving the optimization problem $$\max \log \det W^{-1} \quad (25)$$
s.t.
$$\begin{bmatrix} P^{-1} & (A_iP^{-1}+B_iFP^{-1})' & 0 \\ (A_iP^{-1}+B_iFP^{-1}) & P^{-1} & 0 \\ 0 & W^{-1}B_i^T & \alpha W^{-1} \end{bmatrix} \succeq 0$$

$$\begin{bmatrix} P^{-1} & h_{i,x} \\ h_{i,x}^T & k_{i,x}^2 \end{bmatrix} \succeq 0$$

$$\begin{bmatrix} P^{-1} & P^{-1}F^Th_{i,u} \\ h_{i,u}^TFP^{-1} & k_{i,u}^2 \end{bmatrix} \succeq 0$$

where the volume of the set (23) is propotional to the determinate det $W^{-1}$ of the distance-weighting matrix W. The optimization problem (25) uses information about the dynamics $A_i$ and $B_i$, and constraints $\chi$ and $\mathcal{U}\supseteq\text{conv}(\mathcal{Q})$ on the train to find a quantization rule of the form (22) that produces quantization errors that have the minimal effect on the stopping precision of the train.

If the quantization rule (22) chooses the finite input value $q\in\mathcal{Q}$ then the quantization error is bounded by the Voronoi cell $$\mathcal{W}_q=\{u-q:\|u-q\|_W^2\leq\|u-p\|_W^2 \forall p\in\mathcal{Q}\}.$$

The worst-case quantization error for the quantization rule (22) is bounded by the convex-hull of the quantization error for each finite input value $q\in\mathcal{Q}$ $$\mathcal{W}=\text{conv}\{\mathcal{W}_q:q\in\mathcal{Q}\} \quad (26)$$

The control invariant set $c(P,\mathcal{W})$ will be non-empty if the quantization errors (26) are small $\|w\|_W^2=\|u-q(u)\|_W^2\leq 1$ i.e. $\mathcal{W}\subseteq\varepsilon(\mathcal{W})$. This means that it is possible to precisely stop the train within the desired range while satisfying constraints despite parameter uncertainty and quantization errors. The optimal choice (25) for the weighting matrix W depends on the choice of the input set $\mathcal{U}\supseteq\text{conv}(\mathcal{Q})$.

Figure 11:
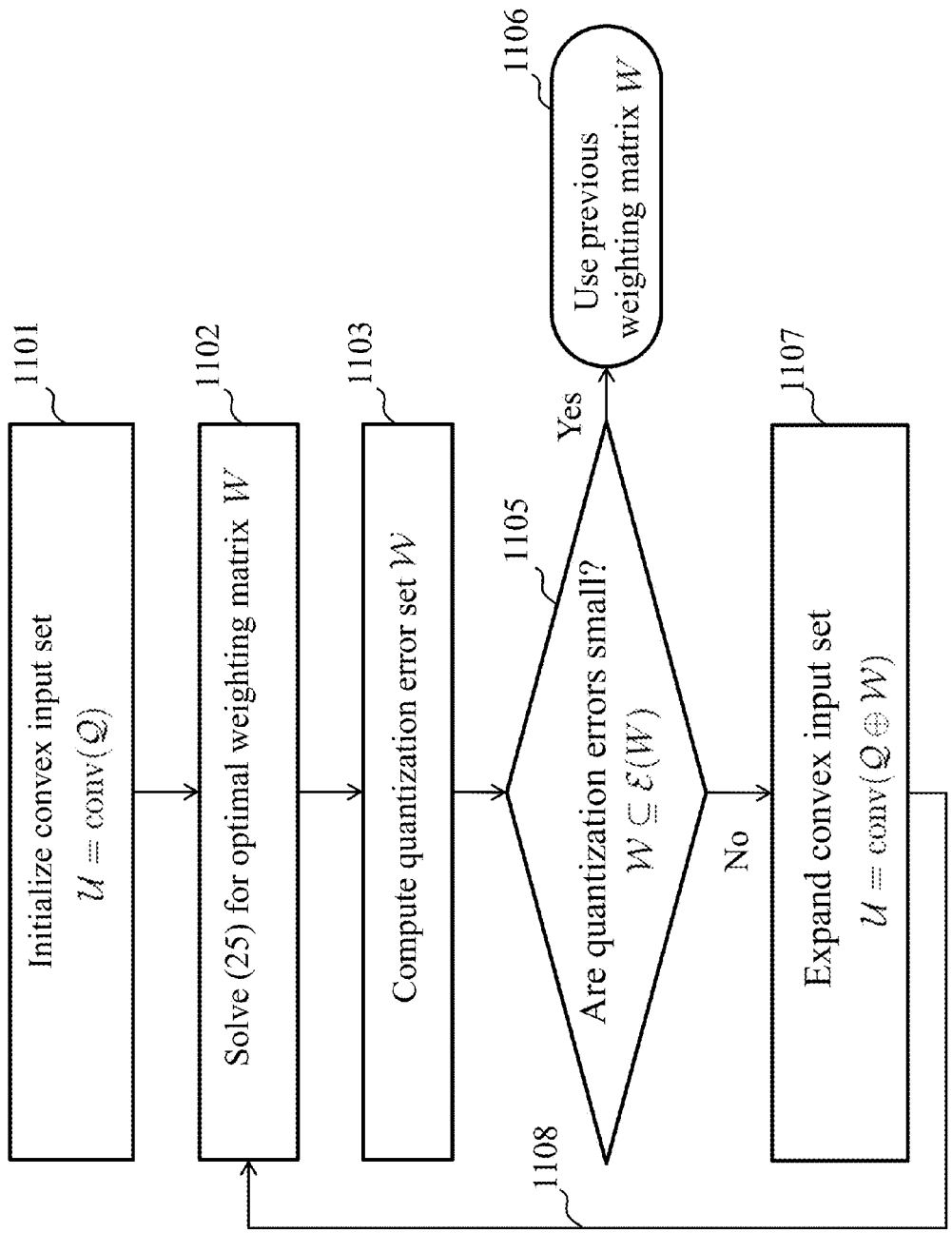
FIG. 11 is a block diagram of a method including an algorithm for producing an optimal quantization rule that accounts for the dynamics and constraints of the train, according one embodiment of the present disclosure.

FIG. 11 shows a block diagram of a method for choosing the convex input set $\mathcal{U}\supseteq\text{conv}(\mathcal{Q})$. The convex input set is initialized 1101 as the convex hull $\mathcal{U}=\text{conv}(\mathcal{Q})$ of the finite input set of values $\mathcal{Q}$. The optimization problem (25) is solved 1102 to find the optimal weighting matrix W for this input set $\mathcal{U}$. Next the quantization error set (26) for the quantization rule (22) is computed 1103. If the quantization errors are not small 1105 $\mathcal{W}\subseteq\varepsilon(W)$ then the previously computed weighting matrix W 1106 is to be used in the quantization rule (22). Otherwise the convex input set can be expanded 1107 and the design process is repeated 1108.

Figure 12A:
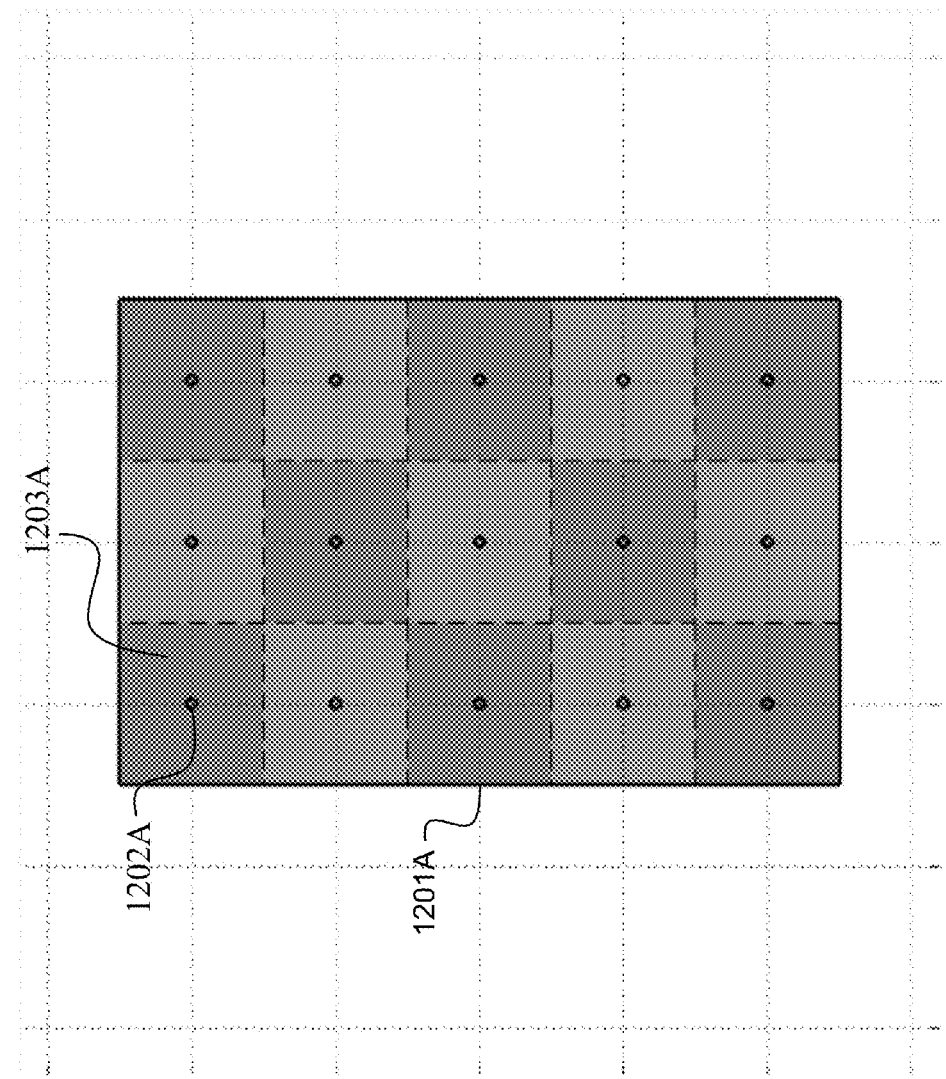
FIG. 12A is a schematic illustrating a naïve quantization rule that maps a convex input to the nearest finite input, according one embodiment of the present disclosure.
Figure 12B:
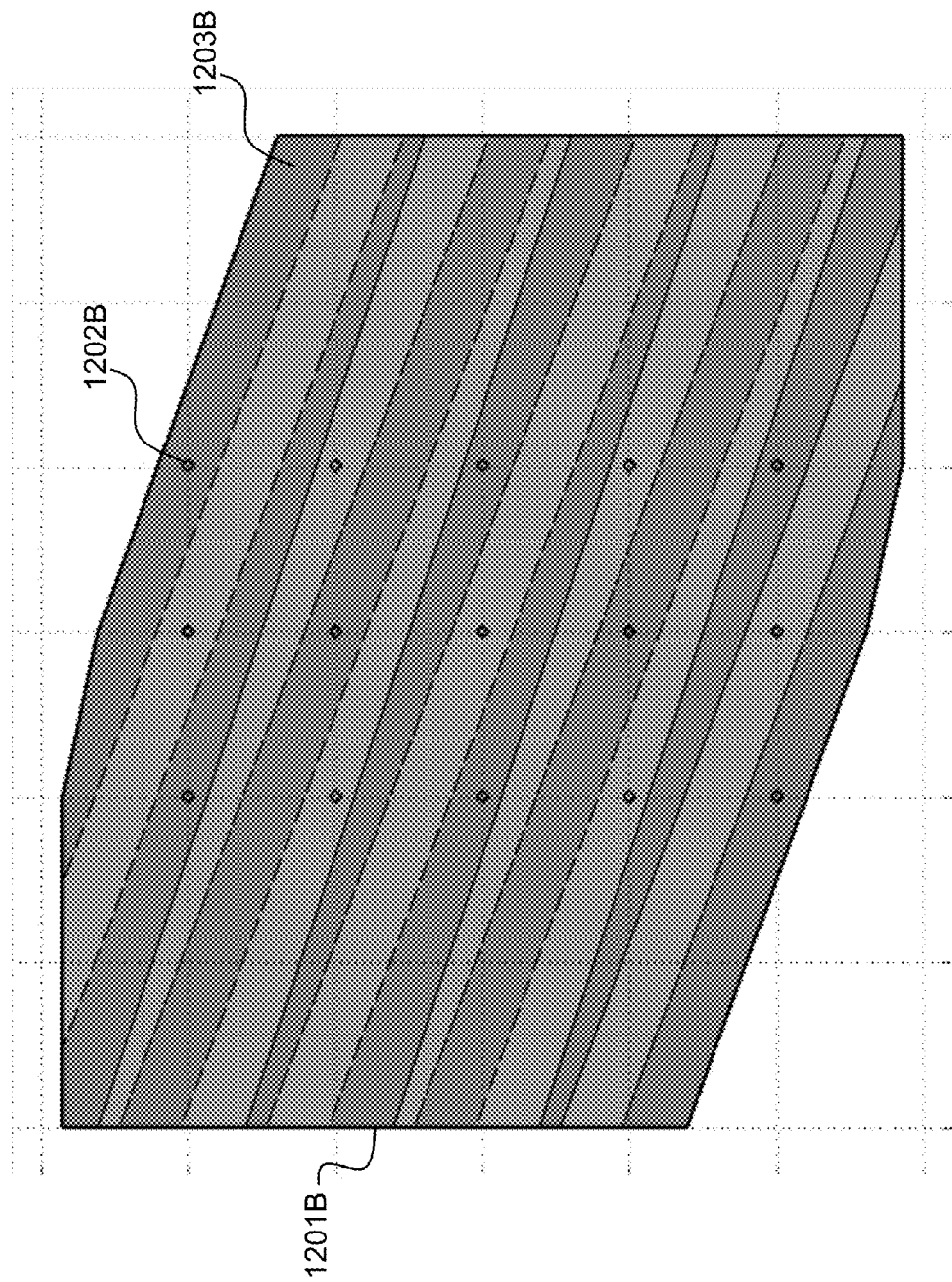
FIG. 12B is a schematic illustrating a quantization rule that maps a convex input to the nearest finite input under a weighted distance function that accounts for the dynamics and constraints of the train to ensure that quantization errors do not effect stopping precision, according one embodiment of the present disclosure.

FIGS. 12A and 12B contrast two examples of quantization rules: a naïve quantization rule and a quantization rule obtained using the algorithm in FIG. 11. The naïve quantization rule shown in FIG. 12A maps the convex input $u\in\mathcal{U}$ to the closest finite input value $q\in\mathcal{Q}$ in terms of the intuitive Euclidean distance. This naïve approach is the current state-of-the-art. The convex input set 1201A is a box around the set of finite input values 1202A. For any convex input in the region 1203A the quantization rule select the quantized input 1202A. The quantization rule shown in FIG. 12A produces quantization errors that are large in bad directions. This means that the train will not stop in the desired stopping range. In other words, the current state-of-the-art does not work or works badly in practice.

The quantization rule shown in FIG. 12B was obtained using the algorithm from FIG. 10. The convex input set 1201B is more complex than the convex set 1201A in FIG. 12A. The quantization rule selects the finite input value 1202B for any convex input in the region 1203B. This quantization rule produces quantization errors that are large in direction that have little effect on stopping precision and produces quantization errors that are small in direction that most adversely affect stopping precision. As a result the control invariant set $c(P,\mathcal{W})$ is not empty and therefore the train is guaranteed to stop in the desired stopping range for any value of the parameters p in P. The quantization rule shown in FIG. 12B is very non-obvious. However, this quantization rule achieves the objective of precisely stopping the train in the desired stopping range.

Figure 13:
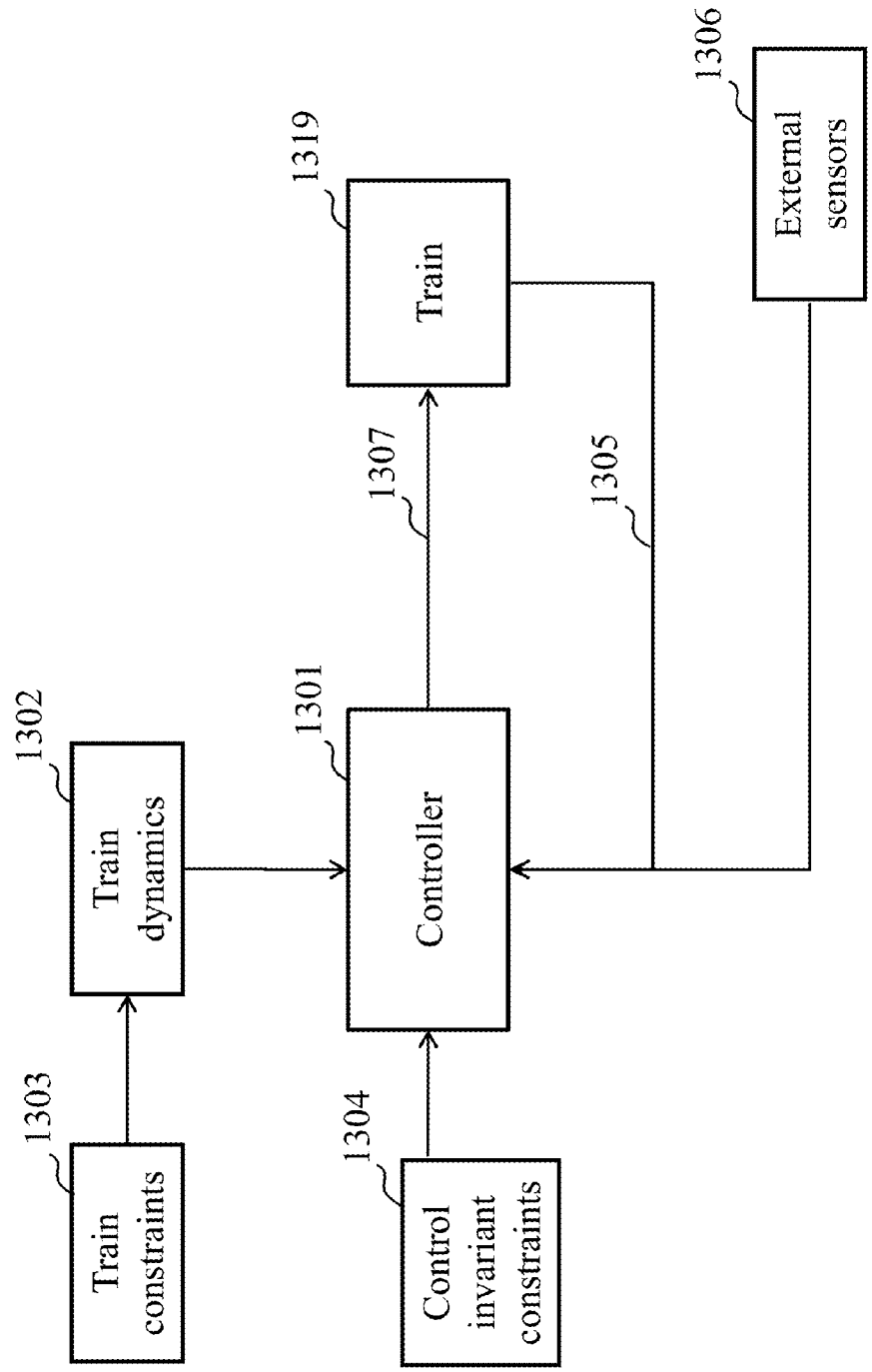
FIG. 13 is a block diagram of a method including a predictive control system, according to according one embodiment of the present disclosure.

Train Stopping Control Systems based on Control Invariant Sets and Soft Landing Constraints FIG. 13 shows a diagram of a predictive control system 1301 according to some embodiments of the present disclosure. The control system 1301 has a model of the train dynamics 1302 such as a model (14), the equations 1303 of the train constraints (6), (7), and the control invariant sets 1304. The controller 1301 receives information from train 1319 on board sensors 1305, such as wheel speed sensors, electric motor current, braking systems pressure, and possibly from external sensors 1306, such as GPS satellites, base stations, sensors along or within the rail tracks.

Based on such information the controller 1301 selects commands for the propulsion force needed to influence the train motion which are sent to the train 1319 and used in the propulsion system, where a positive force is actuated by the traction motors, and a negative force is actuated from the braking system. The controller 1301 may solve the problems (12) or (13) from current time T to $t_f=\infty$, thus obtaining full trajectory for the input that is sent to the train propulsion system. More commonly, the controller 1301 operates in a receding horizon strategy as described in FIG. 6, thus receiving data from sensors that amounts to acquiring the current state, initializing and then solving a finite time optimal control problem either (15), or (16), or (17), and commanding the first component of the computed input to the train propulsion system (see FIG. 6).

If the constrained control of Equations (12) or (13) or (15) or (16) or (17) is solved always with a feasible solution, then the train stops in the desired range of locations. Furthermore, for the control described in Equations (16) and (17) guarantees that if the first problem solved when the control system is first activated is feasible, all the subsequent problems are feasible, and hence the train stops in the desired range of locations. It is also realized that in order for the first problem to be feasible, it is enough to initialize the controller when the current state x(t) of the train system is in the control invariant set, $x(t) \in \mathcal{C}$ for (16), $x(t) \in \mathcal{C}(P)$ for (17a), and $x(t) \in \mathcal{C}(P, \mathcal{W})$ for (17b).

Furthermore, it is realized that by using the control invariant subset determined using the backward-reachable region computation starting from the feasible region, the train control system does not require a calibration to achieve the primary target, because the control invariant subset is determined independently of all the controller calibration parameters, such as the length of the horizon, h, and the cost function components L, F.

These parameters can be selected to obtain secondary objectives of the controller such as minimum time stopping, for which L are selected as $$L=d^2, \qquad (26)$$

minimum braking effort $$L=F^2, \qquad (27)$$

which also provides smooth deceleration, minimum velocity stopping $$L=v^2, \qquad (28)$$

minimum energy $$L=u_v^2, \qquad (29)$$

which penalizes only the use of traction motors by defining $u_v \geq F$, or a combination of the above functions. For (27), (28), F=L, for (27), (29) F=0. The horizon length h can be selected based on timing requirements since longer horizon provides better performance with respect to the select secondary objective, but requires longer computations for the controller to generate the commands.

In the embodiment using the dynamics on the right hand side of (18) are used, and the stopping constraints includes linear inequalities, the problems (15), (16), (17) can be converted into quadratic programming problems that can be solved more effectively.

Figure 14:
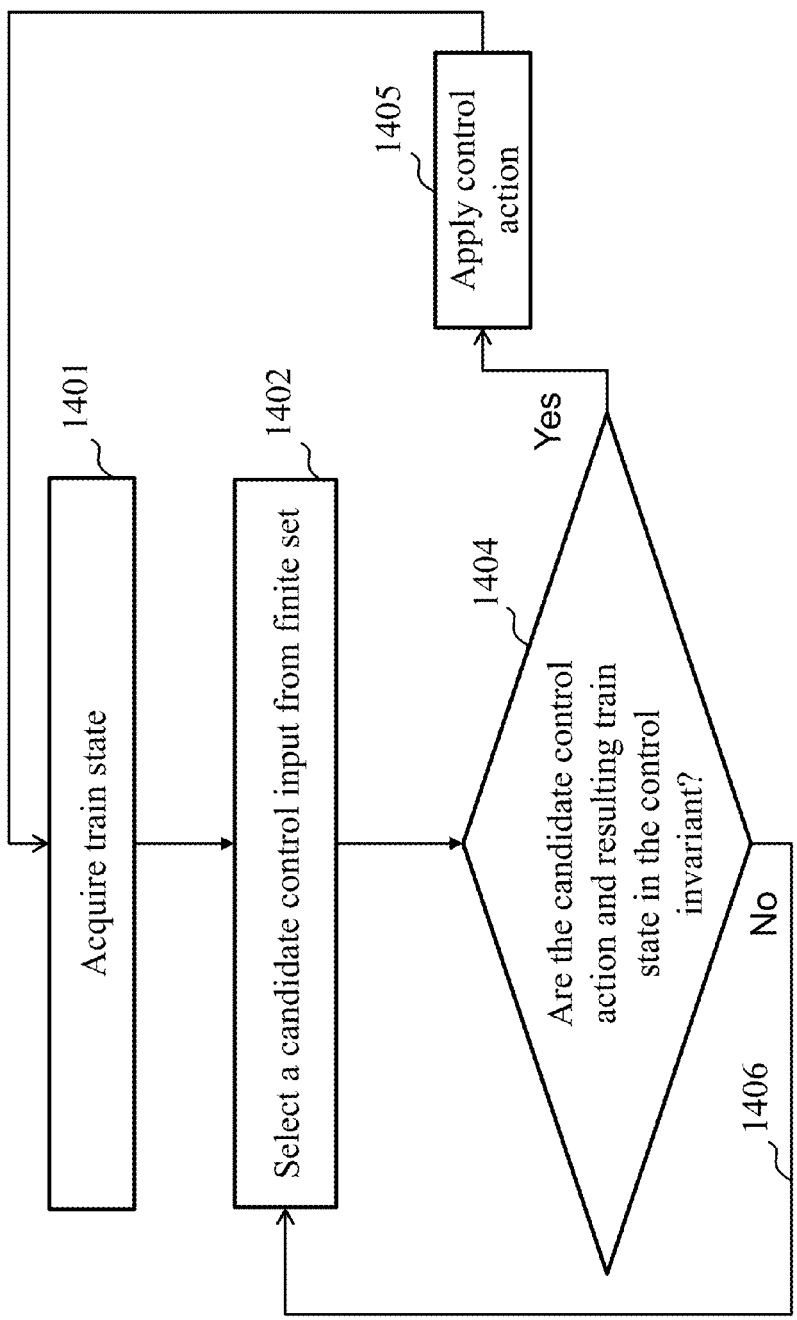
FIG. 14 is a block diagram of a controller that does not use a full model of the train dynamics but instead uses the control invariant set to select the braking command, according one embodiment of the present disclosure.

FIG. 14 shows a block diagram of a control that uses that does not use a full model of the train dynamics nor solve an optimization problem to select the control input. Instead the controller searches the finite set of values $\varrho$ for a braking command $q \in \varrho$ that keeps the train state inside the control invariant set.

For example, the embodiment acquires 1401 the train state from sensors 1405, 1306. Then it selects 1402 one of the finite control input set of values $q \in \varrho$ and uses the train model to test 1404 whether the train state resulting from applying this control input $q \in \varrho$ will keep the state inside the control invariant set. If so, then the control input $q \in \varrho$ is applied 1405. Otherwise 1406 the controller checks and/or tests another control input. By the definition of the control invariant set, at least one control input $q \in \varrho$ in the finite set of values $\varrho$ will ensure that the future state of the train lies in the control invariant set.

Closed-Loop Train Behavior

Figure 15A:
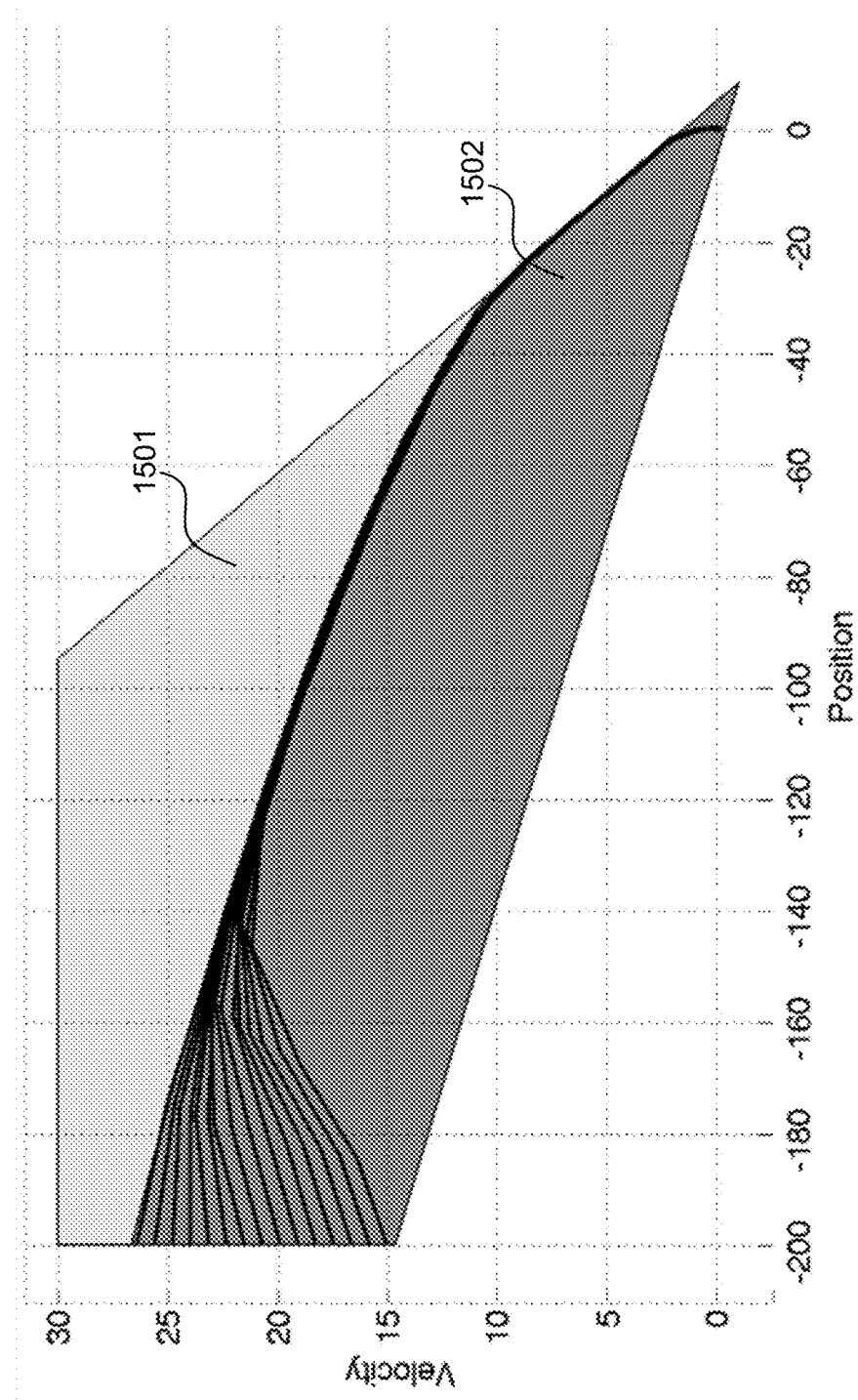
FIGS. 15A and 15B are graphs illustrating the position and velocity of the train under the train automatic stopping control, i.e. stopping controller, according one embodiment of the present disclosure.
Figure 15B:
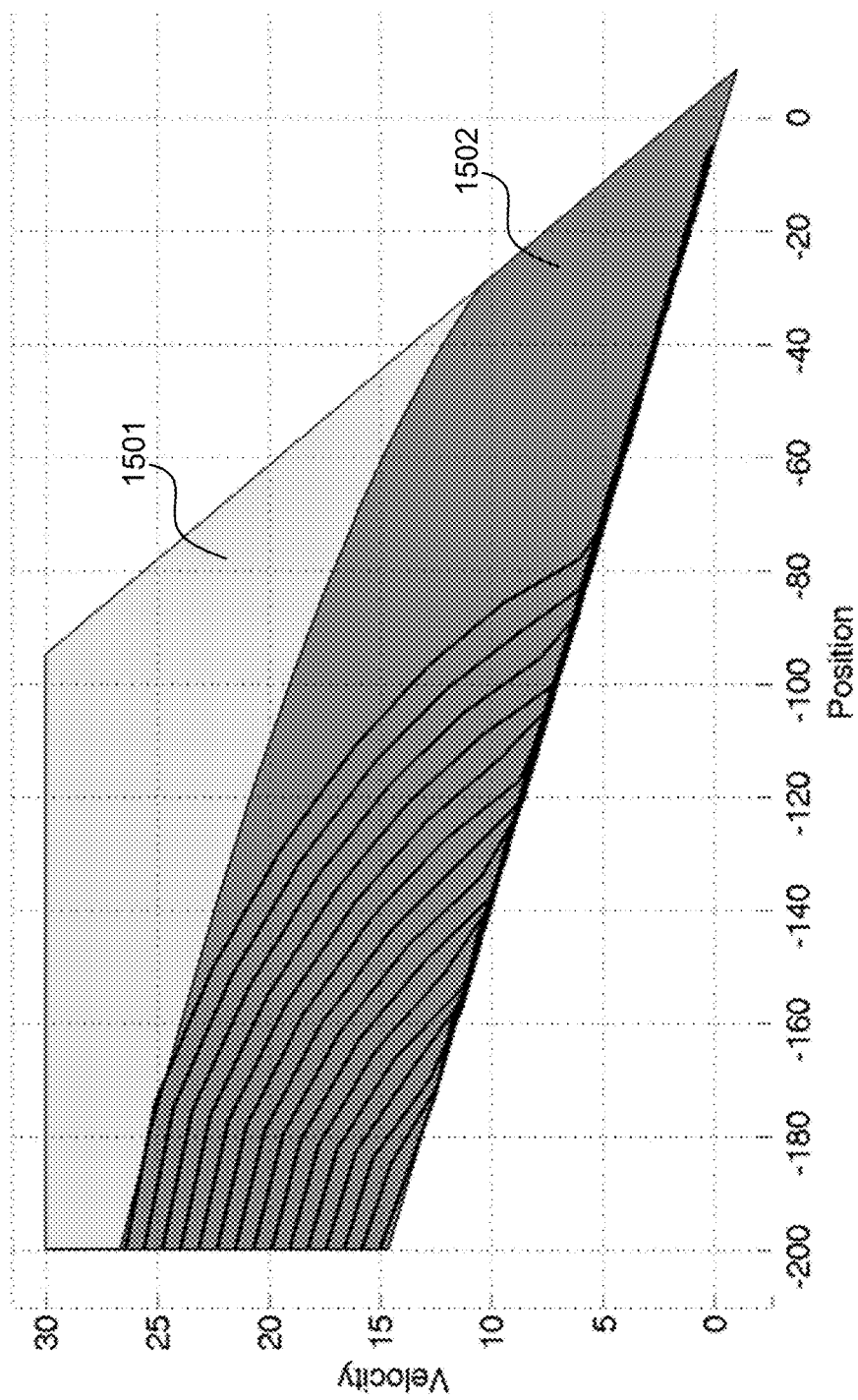

FIGS. 15*a* and 15*b* are graphs illustrating the position and velocity of the train under the train automatic stopping control, i.e. stopping controller, according one embodiment of the present disclosure. For example, FIGS. 15A and 15B illustrate two examples of the motion of the train under the train automatic stopping control disclosed in this patent.

FIGS. 15A and 15B show the feasible region 1501 for the position and velocity of the train, and the control invariant set 1502 for the train. Recall that the control invariant set 1502 is the set of positions and velocities of the train for which it is possible to guarantee that the train does not leave the feasible region 1501 due to its momentum, external disturbances, and uncertainty about the train dynamics, among other things. In the simulations, the train starts 200 meters from the desired stopping range with different initial velocities (given in meters per second). The braking force can be computed by solving an optimization problem for example. The constraints of the optimization problem ensure that the train remains in the control invariant set 1502. The cost function of the optimization problem chooses the best feasible braking force based on different criteria.

In FIG. 15A the cost function seeks to minimize the amount of time the train takes to arrive at the station. Thus the ad-hoc run-curves in each simulation trial reach the upper-boundary of the control invariant set 1502.

In FIG. 15B the cost function seeks to minimize the velocity of the train as it approaches the station. Thus the run-curves in each simulation trial reach the lower-boundary of the control invariant set 1502. Different cost functions can be used in the optimization problem to produce ad-hoc run-curves with different properties. Thus it is easy to tune the behavior of the train automatic stopping control system disclosed in this patent.

Another advantage of the train automatic stopping control disclosed in the present disclosure, among many possible advantages, is that the ad-hoc run-curve is re-computed online at each sample-time based on the most recent measurement of the train state. The cost function of the optimization problem ensures that the ad-hoc run-curve is the optimal run-curve for the train given its current position and velocity. The constraints of the optimization problem ensure that the ad-hoc run-curve is always physically realizable by the dynamics train. Run-curves that are pre-computed offline are not necessarily optimal nor are they necessarily physically realizable.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method for controlling a movement of a train to a stop at a stopping position between a first position and a second position, comprising:
    determining constraints of a velocity of the train with respect to a position of the train forming a feasible region for a state of the train during the movement, such that a lower curve bounding the feasible region has a zero velocity only at the first position, and an upper curve bounding the feasible region has a zero velocity only at the second position;
    determining a control invariant subset of the feasible region, wherein for each state within the control invariant subset there is at least one control action having a value selected from a finite set of values that maintains the state of the train within the control invariant subset; and
    controlling the movement of the train subject to the constraints by selecting a control action maintaining the state of the train within the control invariant subset of the feasible region, wherein the steps of the method are performed by a processor.

2. The method of claim 1, further comprising:
    determining iteratively the control invariant subset using a backward-reachable region computation starting from the feasible region, wherein each iteration comprises:
    shrinking the feasible region with a quantization error defined by the finite set of values and a quantization rule of the finite set of values to produce a shrunk feasible region; and
    determining the backward-reachable region, such that for each state within the backward-reachable region there is at least one control action moving the state of the train within the feasible region for all parameters from the set of possible parameters of the train; and
    replacing the feasible region with the backward-reachable region, wherein the iterations are performed until a termination condition is met.

3. The method of claim 2, wherein the constraints are linear inequalities and train dynamics are represented as a set of linear models subject to additive disturbances wherein, the backward-reachable region computation uses the train dynamics and includes:
    determining a worst case effect of an additive disturbance; and
    determining the backward-reachable region as an intersection for backward reachable regions of the linear models in the set.

4. The method of claim 3, wherein the additive disturbance includes the quantization error.

5. The method of claim 4, wherein the shrinking comprises:
    determining a set of planes approximating a boundary surface of the feasible region;
    determining a direction normal to each plane to produce a set of directions;
    determining a worst case quantization error for each direction; and
    moving a plane inward the feasible region into the direction normal to the plane by a distance equals the worst case quantization error determined for the direction.

6. The method of claim 5, wherein the worst case quantization error for each direction is determined using a linear program.

7. The method of claim 5, further comprising:
    determining the quantization rule reducing the worst case quantization error.

8. The method of claim 3, wherein the linear models and the additive disturbance are such that the state of the train, control inputs, and the train dynamics are within a convex combination of the linear models and values of additive disturbance for any values of parameters of the train.

9. The method of claim 1, wherein the constraints are linear inequalities, such that the train dynamics are represented as a set of linear models subject to additive disturbances, and wherein optimizing is obtained by a constrained quadratic programming.

10. A method for controlling a movement of a train to a stop, at a stopping position between a first position and a second position over a finite horizon of time, comprising:
    determining constraints of a velocity of the train with respect to a position of the train forming a feasible region for a state of the train during the movement, such that a lower curve bounding the feasible region has a zero velocity only at the first position, and an upper curve bounding the feasible region has a zero velocity only at the second position;
    determining a control invariant subset of the feasible region, wherein for each state within the control invariant subset there is at least one control action having a value selected from a finite set of values that maintains the state of the train within the control invariant subset; and
    controlling the movement of the train subject to the constraints by selecting a control action maintaining the state of the train within the control invariant subset of the feasible region over the finite horizon of time, wherein the steps of the method are performed by a processor.

11. The method of claim 10, wherein the selection of the control action is repeated for each time step within the finite horizon of time on the basis of an optimizing the state of the train within the feasible region, wherein the optimizing includes a cost function representing movement of the train subject to the constraints defined by that control invariant subset of the feasible region, as compared with the optimization within the feasible region itself, so the train stops at the second position.

12. The method of claim 11, wherein the cost function includes a combination of an energy consumption of the train during the finite horizon of time, the finite horizon of time, both the energy consumption and the finite horizon of time, the energy consumption for a predetermined time for the finite horizon of time, or a smoothness of a stopping trajectory stopping at the second position.

13. A system for controlling a movement of a train to a stop at a stopping position between a first position and a second position, comprising:
  a set of sensors that monitor and collect data relating to operation of the train;
  a memory having stored therein train data;
  at least one processor, coupled to the memory, and instructions stored therein, for execution by the at least one processor to:
    determine constraints of a velocity of the train with respect to a position of the train forming a feasible region for a state of the train during the movement, such that a lower curve bounding the feasible region has a zero velocity only at the first position, and an upper curve bounding the feasible region has a zero velocity only at the second position;
    determine a control invariant subset of the feasible region, wherein for each state within the control invariant subset there is at least one control action having a value selected from a finite set of values that maintains the state of the train within the control invariant subset; and
    control the movement of the train subject to the constraints by selecting a control action maintaining the state of the train within the control invariant subset of the feasible region.

14. The system of claim 13, wherein the at least one processor is further configured to:
  determine iteratively the control invariant subset using a backward-reachable region computation starting from the feasible region, wherein each iteration comprises:
    shrink the feasible region with a quantization error defined by the finite set of values and a quantization rule of the finite set of values to produce a shrunk feasible region; and
    determine the backward-reachable region, such that for each state within the backward-reachable region there is at least one control action moving the state of the train within the feasible region for all parameters from the set of possible parameters of the train; and
    replace the feasible region with the backward-reachable region, wherein the iterations are performed until a termination condition is met.

15. The system of claim 13, wherein the constraints are linear inequalities and train dynamics are represented as a set of linear models subject to additive disturbances, such that the at least one processor is configured to compute the backward-reachable region using the train dynamics that includes:
  determining a worst case effect of an additive disturbance; and
  determining the backward-reachable region as an intersection for backward reachable regions of the linear models in the set.

16. The system of claim 13, wherein the additive disturbance includes the quantization error.

17. The system of claim 14, wherein the at least one processor is configured to shrink the feasible region that includes shrinking by:
  determining a set of planes approximating a boundary surface of the feasible region;
  determining a direction normal to each plane to produce a set of directions;
  determining a worst case quantization error for each direction; and
  moving a plane inward the feasible region into the direction normal to the plane by a distance equals the worst case quantization error determined for the direction.

18. The system of claim 17, wherein the at least one processor is configured to determine the worst case quantization error for each direction by using a linear program.

19. The system of claim 17, wherein the at least one processor is configured to determine the quantization rule by reducing the worst case quantization error.

20. The system of claim 13, wherein the memory has stored therein train data that includes historical data including states of the train and current states of the train.

* * * * *